US007378766B2

United States Patent
Vasilescu et al.

(10) Patent No.: US 7,378,766 B2
(45) Date of Patent: May 27, 2008

(54) ROTATING ELECTRICAL MACHINE, SUCH AS AN ALTERNATOR, PARTICULARLY FOR AN AUTOMOBILE

(75) Inventors: Claudiu Vasilescu, Paris (FR); Michel Fakes, Seclin (FR)

(73) Assignee: Valeo Equipement Electrique Moteur, Creteil (FR)

( * ) Notice: Subject to any disclaimer, the term of this patent is extended or adjusted under 35 U.S.C. 154(b) by 0 days.

(21) Appl. No.: 10/558,328

(22) PCT Filed: May 26, 2004

(86) PCT No.: PCT/FR2004/001300

§ 371 (c)(1),
(2), (4) Date: Sep. 1, 2006

(87) PCT Pub. No.: WO2004/107535

PCT Pub. Date: Dec. 9, 2004

(65) Prior Publication Data

US 2007/0069593 A1  Mar. 29, 2007

(30) Foreign Application Priority Data

May 26, 2003 (FR) .................................. 03 06346

(51) Int. Cl.
*H02K 9/00* (2006.01)
(52) U.S. Cl. ......................................... 310/58; 310/64
(58) Field of Classification Search .................. 310/52, 310/54, 58, 64, 68 D
See application file for complete search history.

(56) References Cited

U.S. PATENT DOCUMENTS

| 1,700,840 | A | * | 2/1929 | Gay ............................. 310/52 |
| 3,801,843 | A | * | 4/1974 | Corman et al. ............... 310/52 |
| 4,295,067 | A |   | 10/1981 | Binder et al. |
| 6,018,205 | A | * | 1/2000 | Ohashi et al. ................ 310/52 |
| 6,307,289 | B1 |   | 10/2001 | Skala |
| 7,047,639 | B1 | * | 5/2006 | Sheen ................... 29/890.032 |

FOREIGN PATENT DOCUMENTS

JP  59-32339  2/1984

OTHER PUBLICATIONS

ISA/EP, International Search Report, PCT/FR2004/001300, Nov. 25, 2004, with translation, 4 pages.
Patent Abstracts of Japan, Publication No. 59-032339 dated Feb. 21, 1984, 2 pages.

* cited by examiner

*Primary Examiner*—Hanh N. Nguyen
(74) *Attorney, Agent, or Firm*—Osha Liang LLP

(57) ABSTRACT

The invention relates to a rotating electrical machine, provided with a stator, a cooling device comprising at least one fan that initiates a coolant flow in order to cool and evacuate, to the outside, the heat produced in the machine comprising at least one heat pipe having at least one heat absorption area, and at least one condensation area. Said heat pipe belongs to a device that rectifies the current produced by the stator of the machine et which extends with its condensation area until reaching the flow of the coolant. The invention can be used for alternators or for alternating current starters in automobiles.

18 Claims, 15 Drawing Sheets

FIG.5
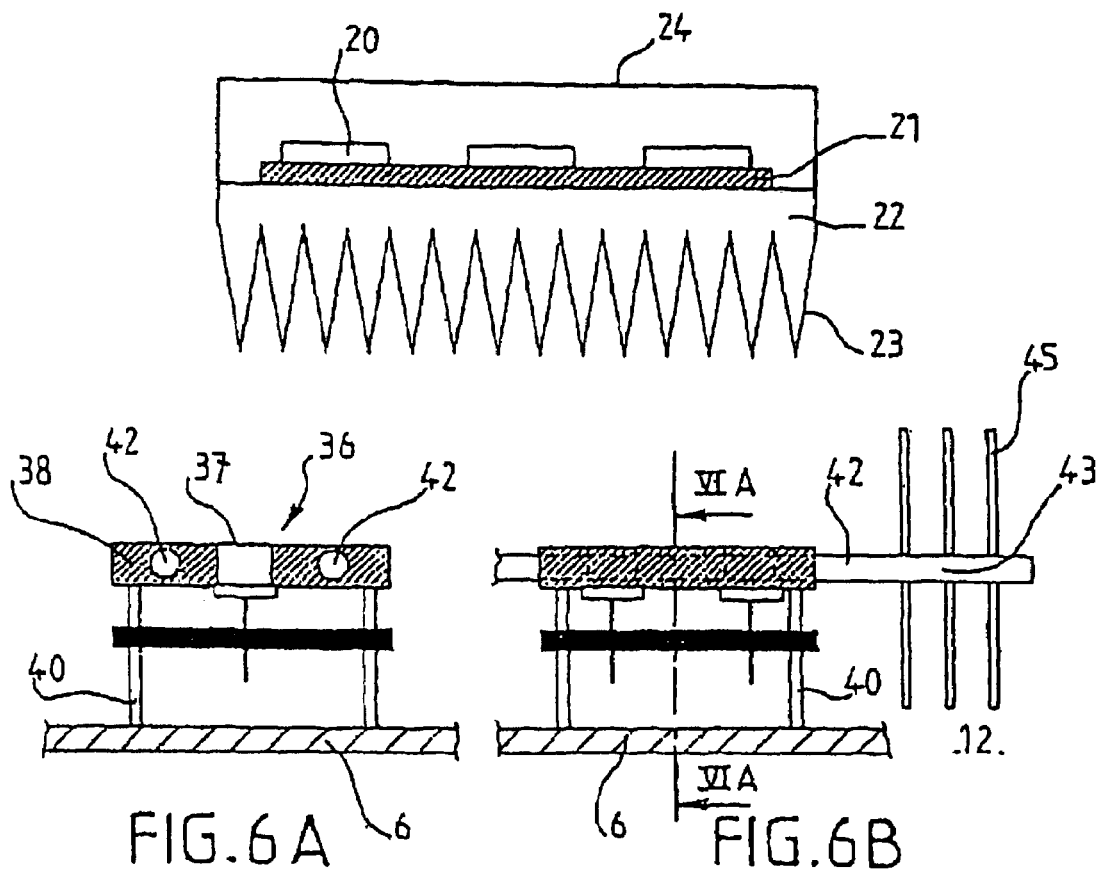
FIG.6A   FIG.6B
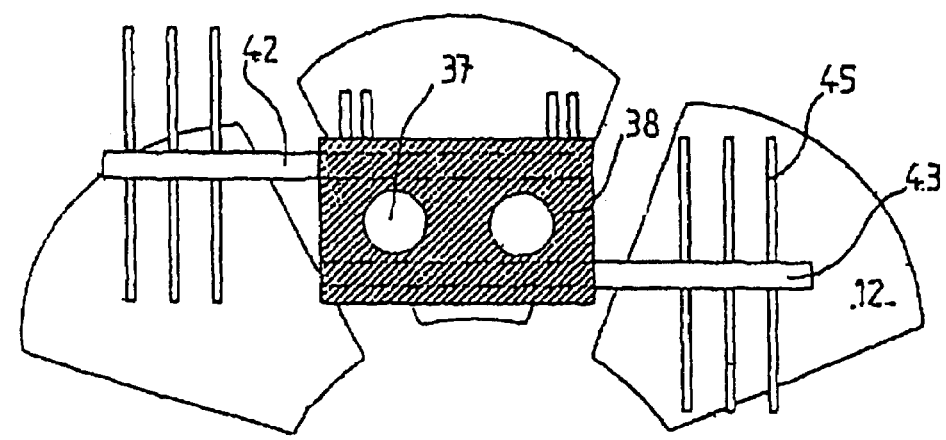
FIG.6C

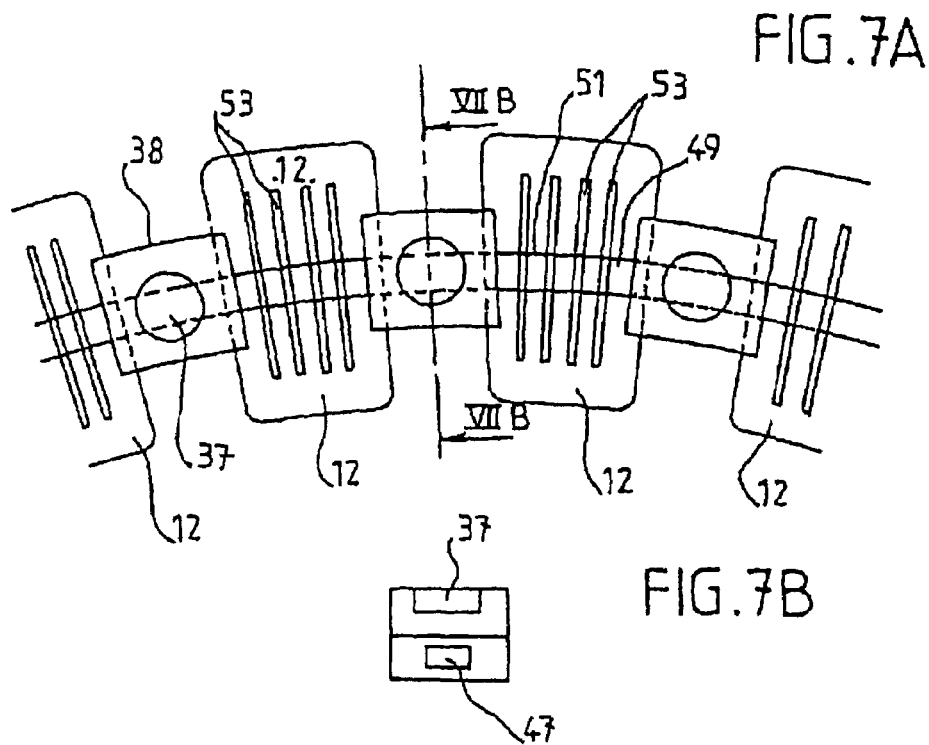
FIG. 7A
FIG. 7B
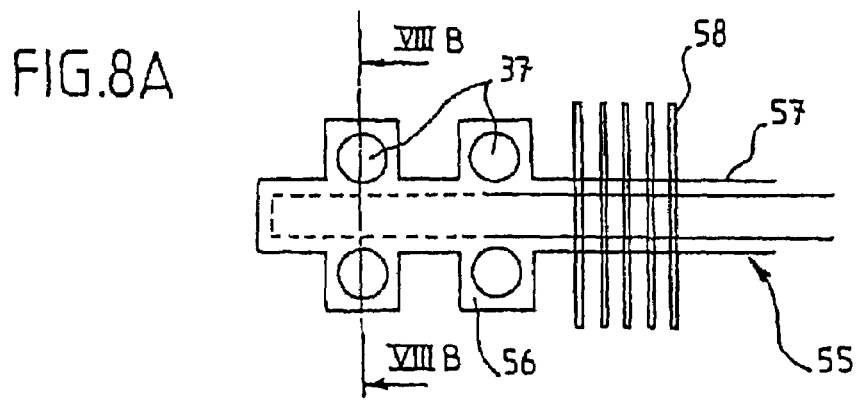
FIG. 8A
FIG. 8B
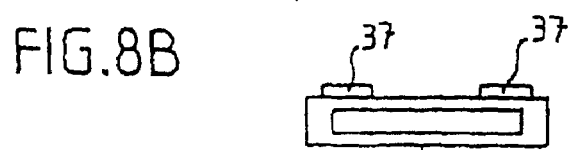
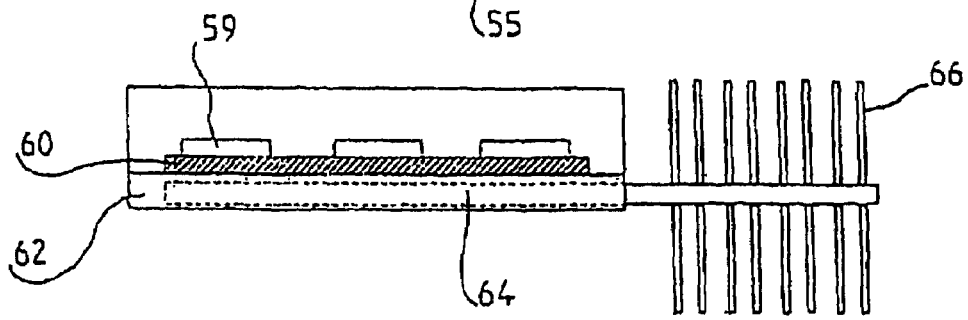
FIG. 9

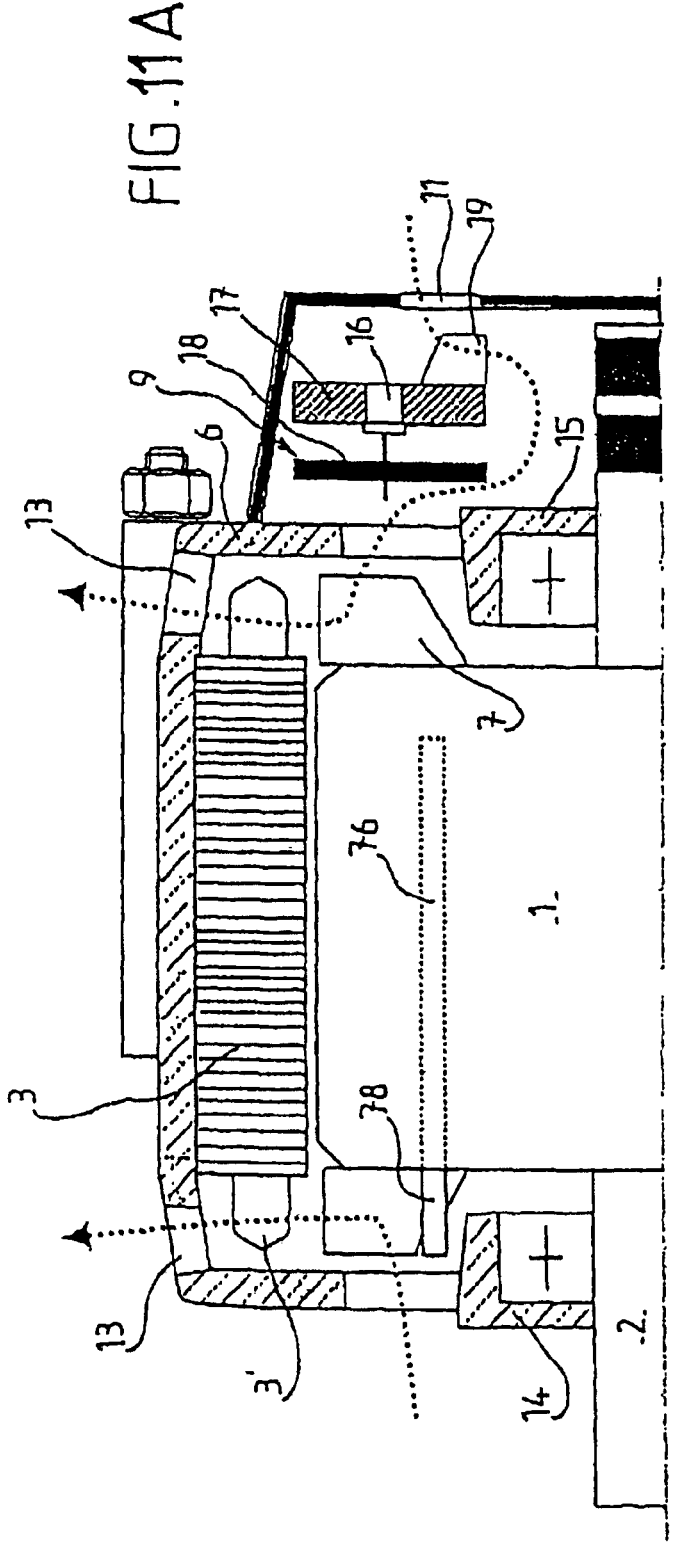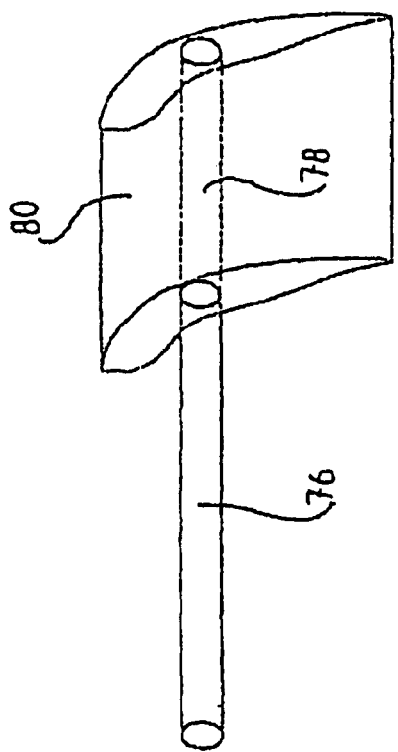

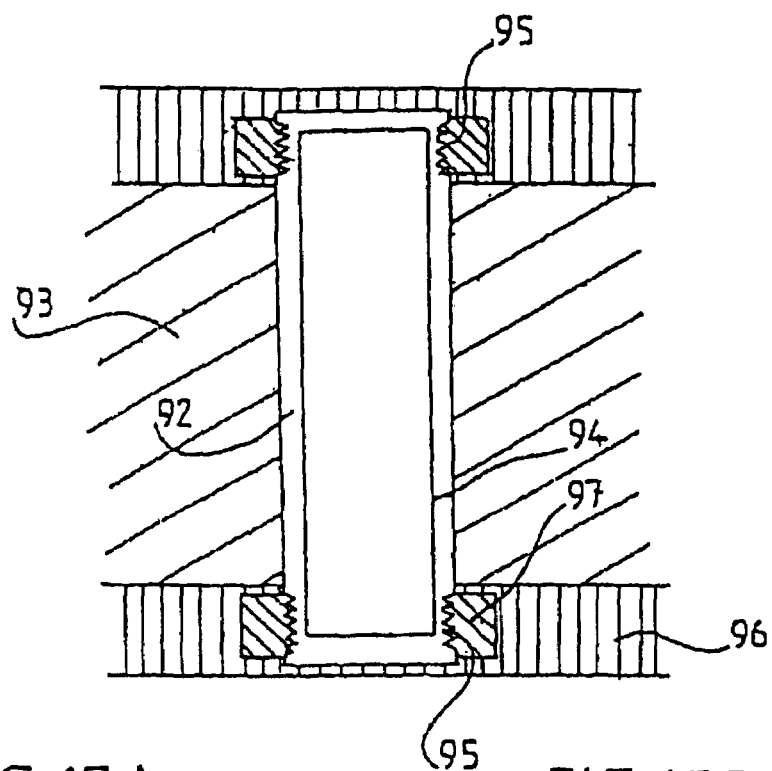
FIG. 14
FIG. 15 A FIG. 15 B
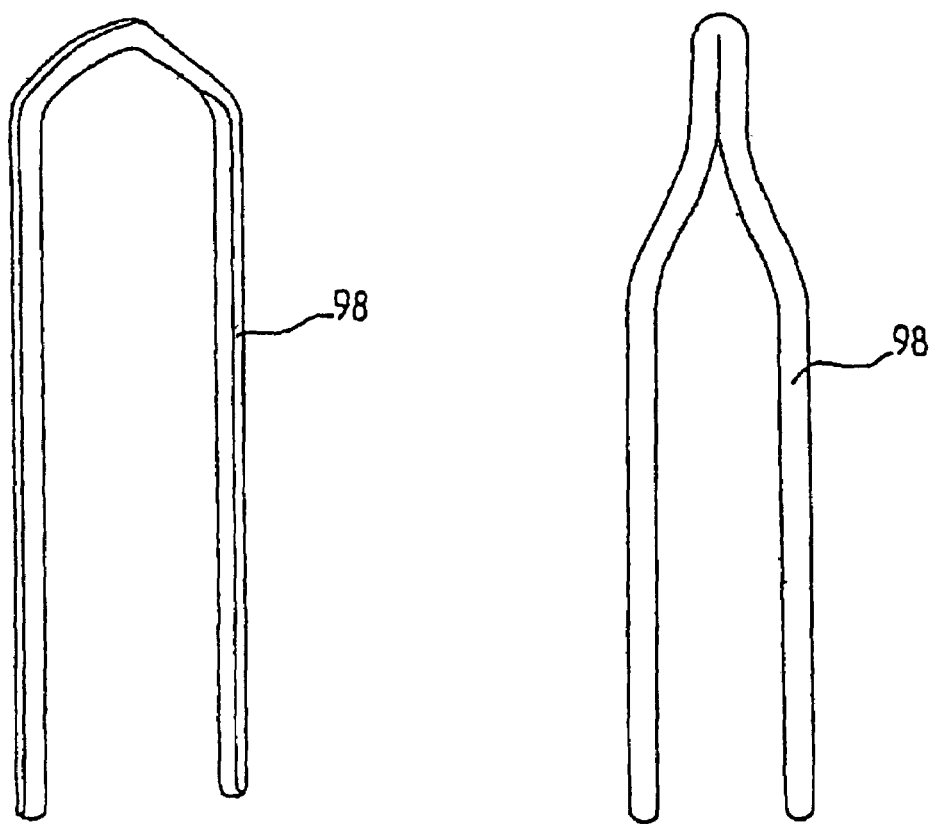

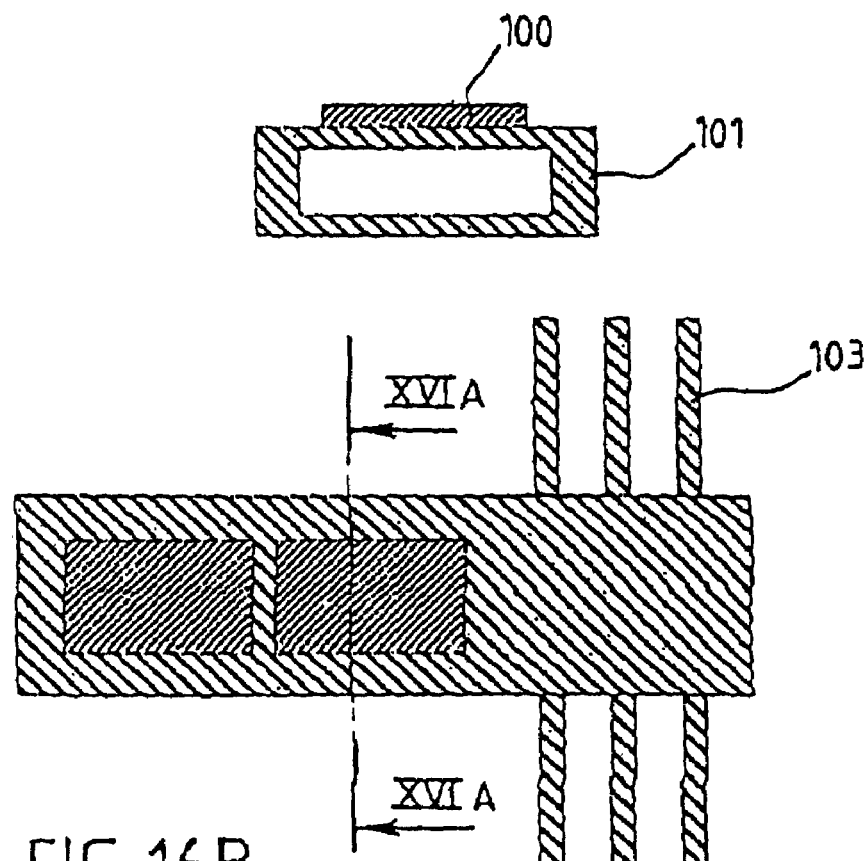
FIG.16A
FIG.16B
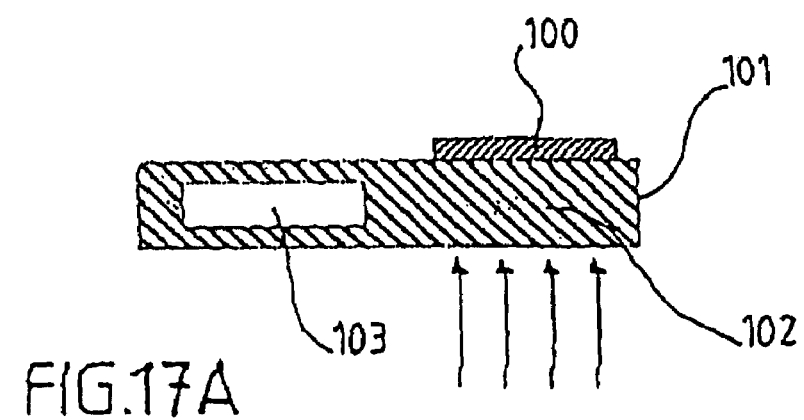
FIG.17A

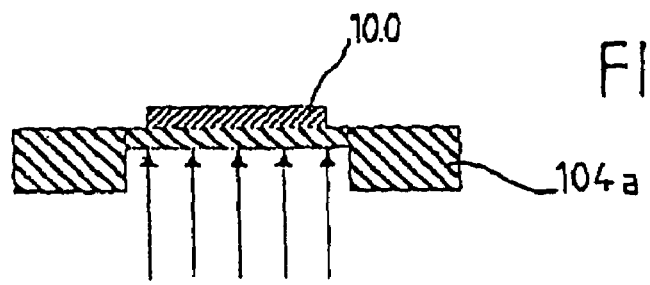
FIG.17B1
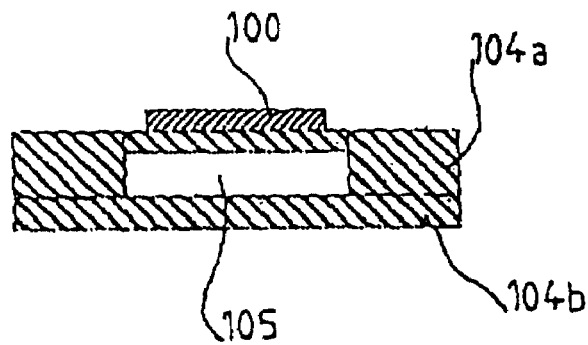
FIG.17B2
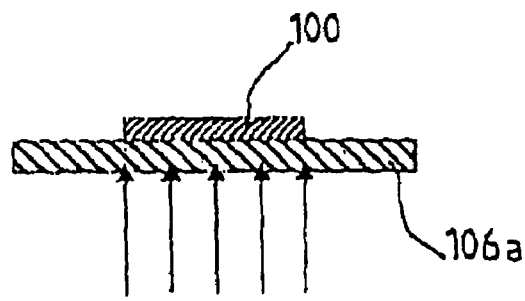
FIG.17C1
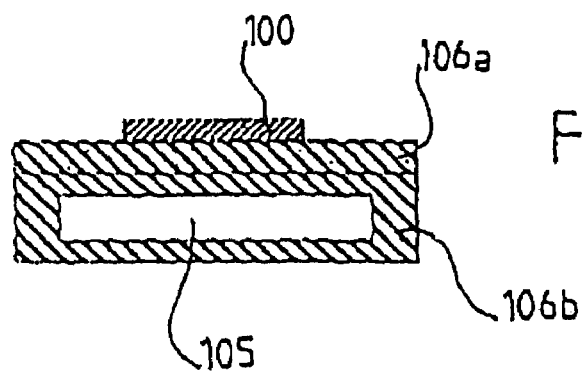
FIG.17C2

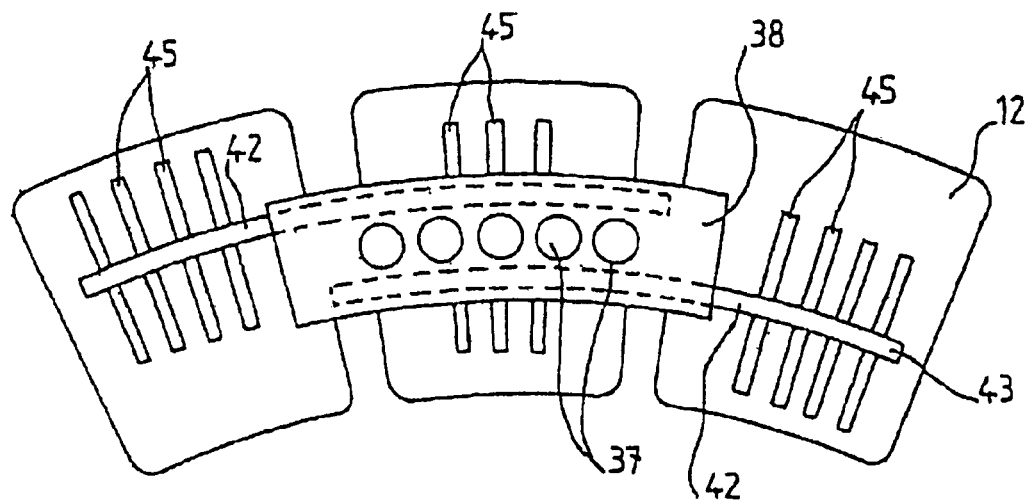
FIG.21
FIG.22
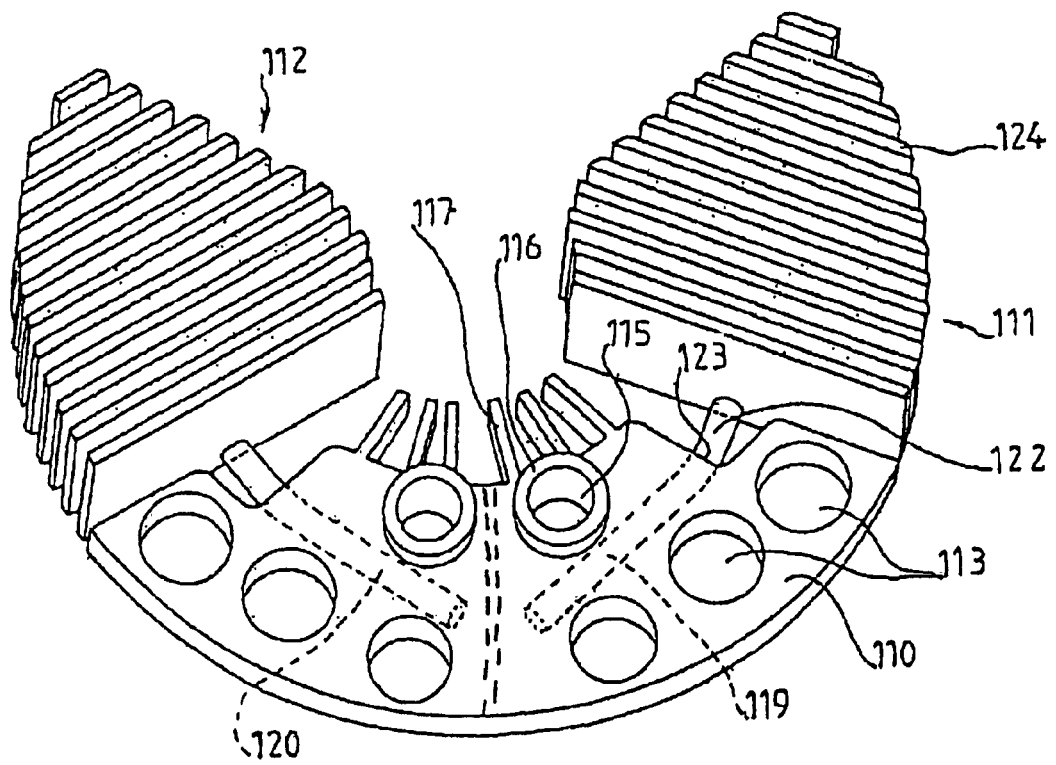

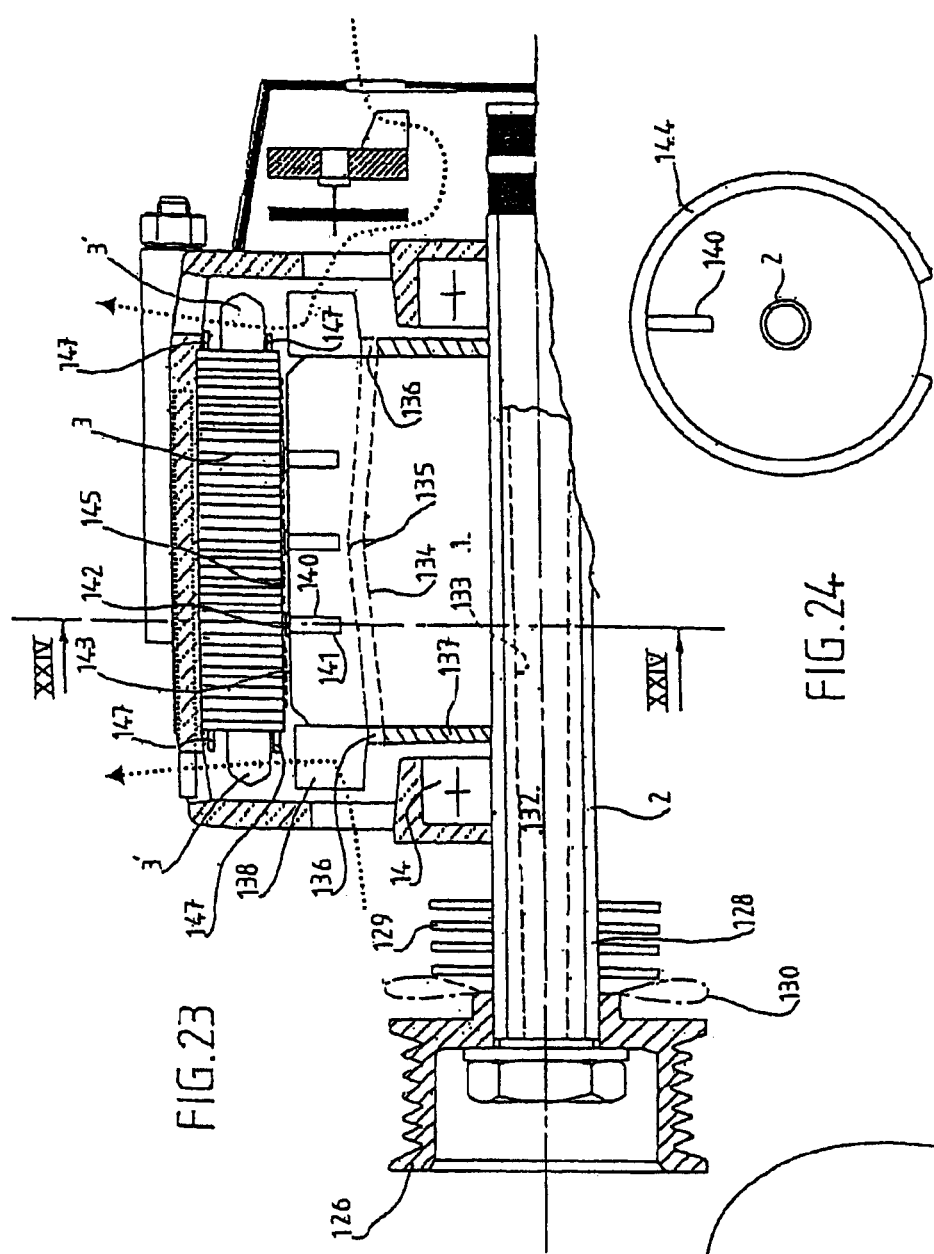
FIG.23
FIG.24
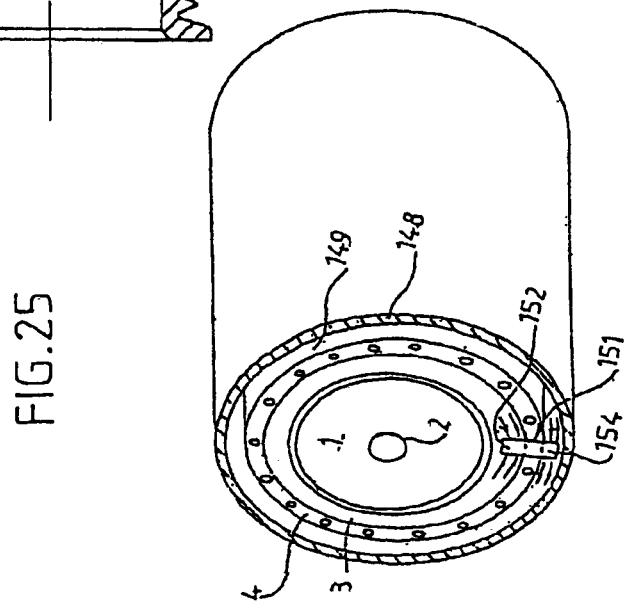
FIG.25

ROTATING ELECTRICAL MACHINE, SUCH AS AN ALTERNATOR, PARTICULARLY FOR AN AUTOMOBILE

FIELD OF THE INVENTION

The invention relates to a rotating electrical machine, such as an alternator or alternator-starter particularly for automotive vehicles, of the type comprising, inside a housing provided with a front bearing and a rear bearing, a stator that carries at least one stator winding, a rotor rotatably mounted inside the stator by means of a shaft supported in said front and rear bearings, a device for rectifying the current generated in the coil of the stator, as well as cooling means and means of evacuating to the outside the heat produced in the machine.

PRIOR ART

In the domain of rotating electrical machines of this type, special effort has been made to find solutions for evacuating the heat dissipated in the rectifier device. Thus it is known, for example by document EP A 0515 259 (U.S. Pat. No. 5,270,605), to provide cooling of the elements dissipating the heat in the rectifier device by forced convection by means of the forced flow of a cooling fluid, in this case air, drawn in by means of a fan integral in rotation with the rotor equipped with at least one rotor winding, through openings in the protective cover associated with the rear bearing. To improve the cooling effect, it is known to provide heat sink elements in the form of fins on the plate of the rectifier on which there are rectifying components. The drawn in air, after having "swept" the heat sink elements, passes through the openings made in the rear bearing of the machine, then exits again by radial backflow louvers of the rear bearing made at the outer periphery of the bearing and thus from the housing.

FIG. 1 diagrammatically represents an alternator equipped with such a cooling device, in this instance by internal ventilation. In this figure the rotor is designated by reference 1, the shaft on which it is mounted and centered by reference 2, the stator by reference 3, the winding of the stator by reference 3', the housing by the general reference 4, the parts of the housing 4 forming front and rear bearings by references 5 and 6 respectively, a rear fan attached to the rotor by reference 7, a front fan also attached to the rotor by reference 8, the rectifier device or bridge by general reference 9, the axial cooling air intake openings in the protective cover bearing reference 10 by reference 11. The axial intake openings provided in the rear bearing 6 are designated by reference 12 and the radial cooling air louvers for discharge outside the machine, by reference 13. At 14 and 15 the figure also represents the front and rear ball bearings by which the front and rear bearings 5 and 6 centrally support the rotor shaft 2 in rotation.

These bearings 5, 6 are hollow and include a part of overall transverse orientation with respect to the axis of the shaft 2, in which are provided the axial openings 12. This transverse part is extended at its outer periphery by a peripheral part, of overall axial orientation with respect to the axis of the shaft 2. It is in this part that the louvers 13 are made, axially of oblong shape (FIG. 2).

The stator 3 is carried internally by the inner periphery of the bearings 5, 6.

It will be remembered that when the rotating electrical machine is a polyphase alternator, the stator carries several stator windings 3' constituting armature windings the outputs of which are connected to the rectifier device or bridge 9 for rectifying the alternating current generated in these windings, also called phase windings, while the rotor carries at least one field winding. For example, the rotor is a claw-pole rotor as described in the above-mentioned document EP A 0 515 259, the field winding being disposed, in a known way, between the end plates of the magnet wheels. The ends of this winding are connected by wires to slip rings on which brushes rub that are located in a brush-holder visible in document EP A 0 515 259. The brushes are connected to a voltage regulator.

The winding of the alternator's stator is therefore an armature winding, while the winding of the rotor is a field winding, like a field coil. The alternator is a variation of the single phase type with just one armature winding.

As an alternative, the alternator is reversible and constitutes and alternator-starter as described in the document FR A 2 745 445 (U.S. Pat. No. 6,002,219) to which reference will be made. During operation in the starter mode, the winding of the stator is a field winding and the winding of the rotor is an armature winding.

With regard to the rectifier device or rectifier bridge 9, the references 16, 17 and 18 designate respectively positive diodes for rectifying the alternating current generated in the windings of the stator, a heat sink plate on which these diodes are mounted and a connector intended to electrically connect the diodes 16, the negative diodes (not shown) being carried by the rear bearing 6 and connected to the connector 18. The heat sink 17 is provided with fins that are indicated at 19. The dotted lines with arrowheads symbolize the flow of cooling air. In particular it will be noted that the flow of cooling air from the rear part of the machine passes through the axial openings 11 of the protective cover 10, come into contact with the fins 19, passes through the axial openings 12 of the rear bearing 6 and exits through the radial louvers 13 of the rear bearing after passing over the rear fan 7 and through the stator winding 3', more specifically through the rear lead-out wire of the winding 3' carried by the body (not referenced) in the form of laminations that comprise the stator 3. The fans 7, 8 in FIG. 1 are of the centrifuge type.

FIG. 1 diagrammatically shows the rectifier bridge 9. FIG. 2 is a perspective view of a specific embodiment of a rectifier bridge attached to the rear bearing of a rotating electrical machine and FIG. 3 is a view in the direction of the arrow III in FIG. 1 of a similar embodiment of a complete rectifier bridge. FIG. 4 shows the bridge of FIG. 3 without the heat sink and without the connector. FIGS. 3 to 4 show the arrangement of the heat sink that carries the positive diodes and the installation of the cooling fins with respect to the axial openings 12 of the bearing 6. In the forms of embodiment according to FIGS. 2 to 4, the negative diodes are fitted directly into the rear bearing and the connector 18 is at the periphery of the bridge above the heat sink carrying the positive diodes of which only the connections of the leads are visible and indicated by reference 16'. For more details, reference can be made to FIG. 13 of the document FR A 2 827 436, identical to FIG. 2, in which the brush holder is not referenced.

It is clear from FIGS. 2 to 4 that the cooling power of a heat sink device with fins, according to the prior art as represented, can not be as high as desired in so far as the heat sink and the fooling fins, because of their very compact design, put up an aeraulic resistance to the flow of cooling air. As a result, the heat dissipating elements, i.e., the positive 16 and negative diodes must be able to withstand relatively high temperatures, making it necessary to use expensive heat dissipating elements.

FIG. 5 shows a cross sectional view of an electronic rectifier module external to an alternator or alternator-starter, according to the prior art. The electronic rectifier and heat dissipation elements designated by reference 20 are of the MOS transistor type, as described, for example, in the document FR A 2 745 445. They dissipate an average power that must be cooled. These elements are carried on a substrate 21 provided with metal traces to provide the electrical connections between the electronic components. This substrate transmits the heat to a mechanical heat sink support 22 while providing electrical insulation. This support is a thermal and electrical conductor and is provided with heat dissipation fins 23. The electronic elements and the substrate are enclosed by the cover 24.

In this solution, which is only for dissipating rectifier bridges having low or medium power, the cooling is generally done by natural convection. Cooling performance is therefore limited by the manufacturing constraints that do not allow the use of fins that are thin enough to increase the exchange surfaces. Thus oversizing the electronics is often necessary to withstand the thermal stresses, which makes this solution relatively costly.

Also known is the provision of cooling fins on the rear bearing itself which then cools the base holding the electronic subassembly. This solution has the disadvantage that it can cause poor cooling of the electronic subassembly if the base is poorly secured to the bearing.

Still another solution according to the prior art consists of providing for evacuation of the heat by circulation of a cooling liquid in the support of the power electronics or ensuring the cooling of the whole machine by providing a water "pocket" or cavity enclosing nearly the whole surface of the machine.

This solution has the major disadvantage of making the machines complex, cumbersome and expensive.

In the document U.S. Pat. No. 4,295,067 the means of cooling and evacuating heat include at least one device comprising a coolant fluid capable of absorbing the heat from the environment, by a first change of state, and of returning the heat to the environment during another change of state, and a means of circulating this fluid between a heat producing section and a heat evacuating section.

The above-mentioned cooling and evacuation device is accomplished in the form of a heat pipe that includes an enclosure in which the coolant fluid circulates, the heat pipe comprising an area of absorption of the heat by evaporation of the fluid and an area for restoring the heat absorbed by condensation of the fluid.

In FIGS. 9 to 14 of this document U.S. Pat. No. 4,295,067 the alternator includes a rectifier device, provided with electronic components for rectifying the current generated in the winding(s) of the stator, which are mounted on means of support made of a thermally conductive material, said alternator having at least one heat pipe extending between the area where an electronic rectifying component is installed to be able to absorb the heat produced by said component, and an area suitable for the evacuation of the absorbed heat.

This section, fitted with fins, is placed outside the alternator at some distance therefrom so that it can easily be damaged and the fins can become fouled, thus diminishing the evacuation of heat.

OBJECT OF THE INVENTION

An object of the present invention is to propose a solution to the problem of cooling electrical rotating machines, which does not have the aforementioned disadvantages of the prior art.

An additional object of the invention is to take advantage of heat pipes.

According to the invention the electrical machine comprises a device for cooling by forced flow of a cooling fluid, such as air, through passages in the housing by means of at least one fan, is characterized in that the heat pipe is part of the rectifier device and is extended by its condenser section into said flow of the cooling fluid.

According to one characteristic of the invention, the condenser section is extended, advantageously in part, in front of at least one passage of the housing.

This condenser section advantageously has at least one heat dissipation projection, such as a fin or a stud, facing said passage to improve the cooling even more.

Thanks to the invention, the rectifier device is near the housing so that the heat pipe(s) are less fragile and have a simpler shape.

Because of the presence of the fan, and thus because of the forced convection, the condenser section is clean and well cooled. This is all the more the case since this area is advantageously placed above a passage.

The passages are composed, for example, of openings or the above-mentioned louvers, depending on whether the nature of the fan is centrifugal or centripetal, respectively.

Because of the invention, which uses convection that is forced and not natural as in the document U.S. Pat. No. 4,295,067, very good evacuation of the heat is achieved.

The rectifier device is more permeable, that is, more aerated, and in one form of embodiment is protected by the cover.

Load losses as well as noise are thus reduced.

The cooling device is more compact so that, in one variation, it can be installed in the outer periphery of the housing at the louvers thereof.

For better evacuation of the heat, decrease in load losses, decrease in noise, better cleaning of the heat pipe(s) and better cooling, the fan advantageously includes two series of blades as described in the document FR A 2 811 156 filed on Jun. 30, 2000.

As an alternative, this fan includes, for example, at least two superimposed mounting flanges and at least two series of blades as described for example in the document FR A 2 741 912.

As an alternative at least one blade of at least one of the series of blades is composed of a heat pipe allowing the rotor to be cooled as well.

The solution in all cases is simple and economical.

According to another characteristic of the invention, the enclosure has a transverse cross section and a length that can vary, and are adaptable to the machine's design data.

According to yet another characteristic of the invention, the enclosure can have the form of a tube or a plate with any transverse cross section and length.

According to still another characteristic of the invention, the support of an electronic rectifier element includes a recess in which the evaporator section of a heat pipe is located.

According to another characteristic of the invention, the support of an electronic rectifier element is mounted on the evaporator section of a heat pipe constructed in such a way as to form a mechanical support device.

Advantageously this support is installed partly facing at least one passage in order to improve its cooling.

In one form of embodiment this support has fins to improve its cooling even more.

According to still another characteristic of the invention for a typical machine having a rear bearing provided with axial openings for passage of a flow of cooling air, the projections, such as the said fins, for heat dissipation are located in the cooling air flow above said axial openings.

According to yet another characteristic of the invention, the machine, in order to improve its cooling as well as the cooling of the rectifier device, also includes at least one additional heat pipe.

Thus, in one form of embodiment means of cooling the stator include at least one heat pipe placed in the housing, advantageously extending parallel to the axis of the stator.

According to still another characteristic a plurality of heat pipes is inserted in the housing and the heat pipes are distributed around the periphery of the bearing.

According to another characteristic, the housing has heat dissipation fins on its outer peripheral face, which are associated with the heat pipes.

According to yet another characteristic for a machine of the type having a housing with external lateral louvers around its periphery for the outlet of the flow of cooling air, at least one heat pipe inserted in the housing extends into a radial louver, the portion of the heat pipe located in the louver constituting a condenser section.

This area is less fragile than the one in the document U.S. Pat. No. 4,295,067 because advantageously it does not extend outside the housing. This area is also quite clean.

According to still another characteristic the machine has means of cooling the stator comprising at least one heat pipe the evaporator section of which is located inside the body that forms the stator, and the condenser section of which is located outside the housing of the machine.

According to yet another characteristic the condenser section of a radial heat pipe is free outside the housing of the machine.

According to another characteristic the housing of the machine is enclosed in an outer jacket and an annular space is delimited between the housing and the outer jacket through which space a cooling fluid such as water flows, and the condenser section of a radial heat pipe is disposed in this annular space.

According to still another characteristic, a radial heat pipe can be extended by its evaporator section into a slot of the body that forms the stator.

According to yet another characteristic, at least one additional heat pipe is axially inserted into the rotor of the machine and extends by at least one end to the exterior, this end constituting a condenser section of the heat pipe.

According to another characteristic, the exterior condensation end of the heat pipe is provided with a fan blade.

Said blade allows the rectifier device as well as the adjacent rotor to be well cooled.

According to still another characteristic, at least one heat pipe is inserted into the rotor of the machine and is sloping with respect to the axis thereof in order to at least promote the return by centrifugal force of the coolant fluid from the condenser section to the evaporator section.

According to yet another characteristic, at least one heat pipe is radially inserted into the rotor, the condenser section of which is located in the gap between the rotor and the stator.

According to another characteristic, for a machine having a rotor provided with slots to receive a field winding, the bottom of at least some rotor slots are configured to receive a heat pipe.

According to still another characteristic, an additional heat pipe is placed in at least one slot of the body that forms the stator, advantageously at the bottom of said slot.

According to yet another characteristic, for a machine including laminations held by axial tie rods, the orifices through which pass the tie rods holding the laminations of the rotor have projections for receiving heat pipe.

According to still another characteristic, at least some tie rods that hold the rotor's laminations are configured as heat pipes.

According to another characteristic, for a machine of the type having at least one stator winding formed by conductors in the form of pins placed in the slots of the body that forms the stator, at least some pins are made in the form of heat pipes.

It will be understood that in general the use of pins makes it possible to decrease load losses because the protruding parts of the pins, called lead-outs, extending on either side of the stator are more permeable to the passage of cooling fluid, usually air.

The cooling air circulates better inside the housing, which allows the rectifier device, more aerated because of the characteristics of the invention, to be better cooled.

In general, when the stator is better cooled, particularly its body or winding, the rectifier device connected to the winding of the stator is also better cooled.

According to yet another characteristic, the machine's housing is enclosed in a hollow plate configured in order to form a heat pipe and better cool the stator.

According to still another characteristic of the invention, the shaft of the rotor is made in the form of a heat pipe.

According to another characteristic, the inner space for receiving the coolant fluid of the shaft of the rotor has walls that are sloping with respect to the axis of the rotor to at least promote a return of the coolant fluid to the condensate state in the evaporator section by centrifugal force.

According to still another characteristic, the outer end of the rotor shaft has, on its peripheral outer face, elements for the dissipation of heat released by the condenser section, such as fins and, if necessary, a fan wheel.

According to yet another characteristic, the condensation part of an axial or sloping heat pipe placed in the rotor is disposed in part of a fan end plate.

Thanks to the invention the number of electronic elements for rectifying the current from the stator, such as diodes, can be increased.

Thus in one form of embodiment the stator is a hexaphase type and therefore has 6 windings, while the rectifier devices have at least one heat pipe and for example 12 diodes, or as an alternative 12 MOSFET type transistors or 12 electronic chips.

As an alternative, the stator is a triphase and the rectifier device includes at least one heat pipe and for example 6 diodes to rectify the current.

The rectifier device can include, in a different way, a negative part carrying negative rectifying diodes for example, and a positive part carrying positive rectifying diodes for example, each positive and negative part comprising at least one heat pipe.

As an alternative, the negative part includes for example diodes of the press-fit type, fitted in the rear bearing or welded, preferably by laser welding, on to a plate that is attached to the rear bearing, alternatively with the use of an electrically insulating layer particularly in the case of an alternator-starter.

The positive part, for example, includes a device to hold positive diodes and at least one heat pipe inserted in the support device advantageously in the form of a heat dissipating plate, such as aluminum, allowing the heat to be evacuated.

As an alternative, the support device, advantageously in plate form, carries all of the rectifier elements (diodes, MOSFETs, chips, etc) and at least one heat pipe. This device is attached to and electrically insulated from the rear bearing such as by electrically insulating studs or an electrically insulating layer.

FIG. 2 shows a terminal 600, called B+ terminal, intended to be connected to the vehicle's on-board power supply system and to the positive terminal of the battery. As an alternative, this terminal is integral with the support device.

As an alternative, the heat pipe serves as support for this B+ terminal.

As an alternative, the rectifier devices are welded or brazed on the support plate, which is then attached, such as by brazing, to the heat pipe.

The rectifier elements are in one form of embodiment directly brazed or glued or welded, advantageously by laser welding, directly on to the heat pipe or as an alternative on to a heat dissipating plate, or in general the support device, which has just been added to the heat pipe by brazing, gluing or welding, advantageously by laser.

The thermal contact resistance is thus decreased between the rectifier element, such as a diode, and its support device or between the diode and the heat pipe, as the case may be. The evacuation of the heat is accomplished by the lower part of the rectifier element, for example by the diode package, which constitutes the most direct path of heat flow.

The heat pipe, according to one characteristic of the invention, can be used as electrical conductor.

It can be sufficient to weld just a part of the surface of the rectifier element, for example 20% to 30% of the surface of the diode package, with the resulting gain in welding time and reduction in the exposure of the semiconductor held by a protruding socket pertaining to the diode package described, for example, in the document FR A 2 446 541 to which reference can be made for more details.

The rectifier elements can be placed side by side, thus avoiding the stresses related to the process of force-fitting the press-fit type diodes.

The support device or the heat pipe is therefore more compact.

BRIEF DESCRIPTION OF THE DRAWINGS

The invention will be better understood, and other purposes, characteristics, details and advantages thereof will become clearer in the following description, provided with reference to the attached drawings, given solely by way of example, illustrating several forms of embodiment of the invention and in which:

FIG. 5 is a cross sectional view, in diagram form, of an external electronic rectifying module for a rotating electrical machine, according to prior art;

FIGS. 6A to 6C are diagrammatical cross sectional views of three similar versions of embodiment of a rectifier bridge, constituting a rectifier device according to the invention, for a rotating electrical machine of the type represented in FIG. 1;

FIGS. 7A and 7B are diagrammatical views respectively in the axial direction of the machine and in cross section along the line VIIB-VIIB of FIG. 7A, of another form of embodiment of a rectifier bridge according to the invention, for a machine of the type represented in FIG. 1;

FIGS. 8A and 8B are views respectively in the axial direction of the machine and in cross section along line VIIIB-VIIIB of FIG. 8A, another form of embodiment of a rectifier bridge according to the invention, for a machine of the type represented in FIG. 1;

FIG. 9 is a cross sectional view of an external electronic module, provided with a cooling device according to the invention;

FIGS. 11A and 11B are views respectively in axial cross section of a rotating electrical machine the rotor of which is equipped with a cooling device and of a detail of this cooling device;

FIG. 14 is a diagrammatical view illustrating the embodiment of a tie rod holding the laminations of a rotor of a machine according to FIG. 1, in the form of a heat pipe;

FIGS. 15A and 15B illustrate a pin of a stator winding of a machine according to FIG. 1, which is made in the form of a heat pipe;

FIGS. 16A and 16B are views respectively in cross section along line XVIA-XVIA of FIG. 16B and in the axial direction of the machine of a support element of an electronic component, made in the form of a heat pipe according to the invention;

FIG. 17A is a cross sectional view of another form of embodiment of a support of an electronic component constructed so as to constitute a heat pipe cooling device according to the invention;

FIGS. 17B1 and 17B2 are diagrammatical cross sectional views illustrating the form of embodiment of a support of an electronic component, constructed in the form of a heat pipe cooling device according to the invention;

FIGS. 17C1 and 17C2 are cross sectional views of another method of constructing a support for an electronic component, constructed in the form of a heat pipe cooling device according to the invention;

FIG. 21 is a view similar to FIG. 6C of another alternative embodiment of a rectifier bridge according to the invention;

FIG. 22 is a view in perspective of a heat sink that holds positive diodes, constructed according to the invention;

FIG. 23 is a view in axial cross section of a rotating electrical machine, showing several alternatives for constructing a heat pipe cooling device according to the invention;

FIG. 24 is a view in radial cross section of the rotor of the machine according to FIG. 23, showing in a cross sectional view along line XXIV-XXIV of FIG. 23 a cooling alternative for the rotor;

FIG. 25 is a diagrammatical view in radial cross section of a machine according to FIG. 1, and intended to show several possibilities of cooling the stator by a heat pipe cooling device according to the invention;

The heat pipe device can have any form, that is, it can be a tube with a circular, rectangular or square transverse cross section, or U-shaped or a plate. This property of being able to take different forms provides the considerable advantage that the heat pipe can be configured to be perfectly adapted to the environment for which it provides cooling, depending for example on the design data for the machine and on the area where the heat is produced. In addition to having any desired transverse cross section, the heat pipe can be configured in various ways in its longitudinal direction. Thus it can be rectilinear, curved or be composed of rectilinear and curved portions. In addition to these advantages, the length of the heat pipe can be chosen nearly unrestrictedly. As a result, a cooling device that uses heat pipes allows the heat to be absorbed directly at the place it is produced, anywhere in the machine, and to transfer this heat by a channel perfectly adaptable to the design data of the machine to a place where it can be optimally evacuated from the machine.

As a result of its extremely efficient and adaptable cooling device, the invention makes it possible to design powerful machines because the restrictions imposed by thermal considerations are greatly reduced.

Described below, by way of example of multiple possibilities of using the cooling system of the invention, are a number of forms of embodiment thereof.

Figure 18:
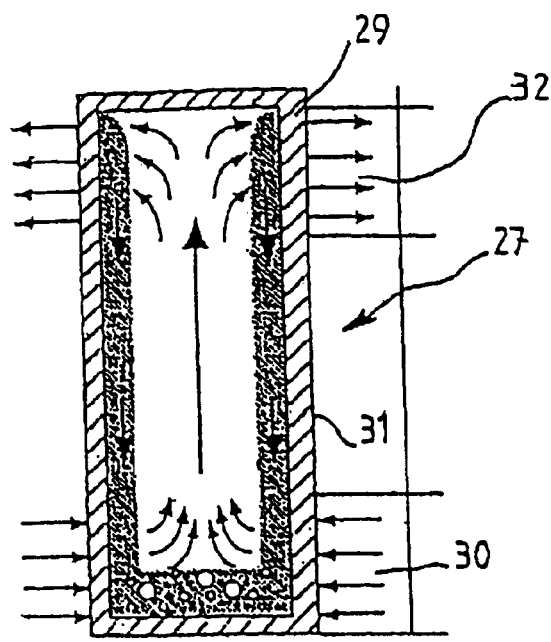
FIGS. 18 to 20 are diagrammatical illustrations of three forms of embodiment of a heat pipe according to the invention.
Figure 19:
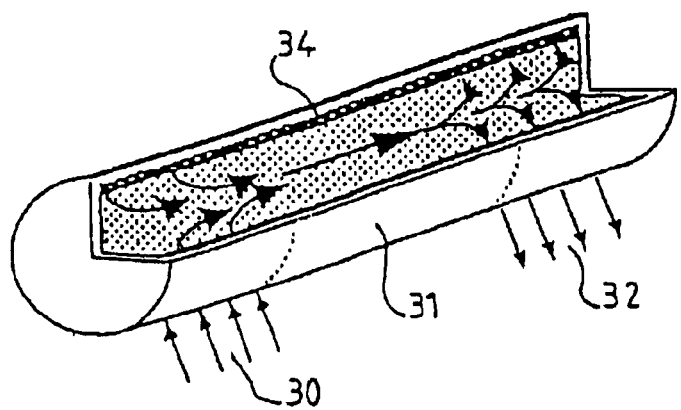

With reference to FIGS. 18 and 19, two types of heat pipe will be explained that are differentiated by their method of operation. The heat pipe according to FIG. 18 is of the thermosyphon type, while the heat pipe of FIG. 19 is a capillary pump type.

Figure 20:
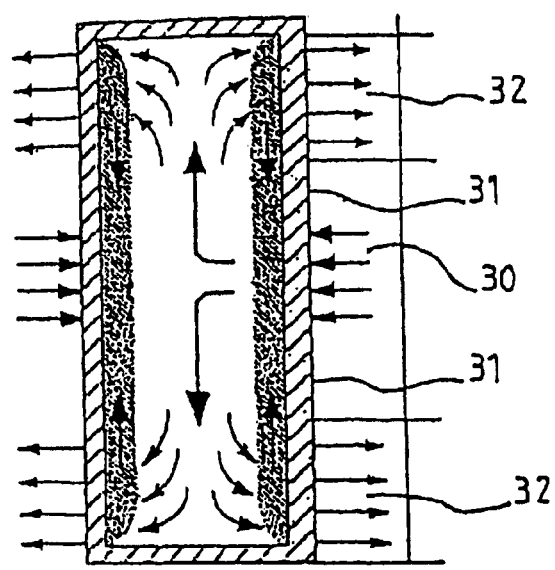

In both cases the heat pipe, generally designated by reference 27, includes an impervious metal enclosure 29, such as a copper based enclosure. The enclosure 29 contains a liquid in equilibrium with its vapor in complete absence of air, or in general, any other gas. The heat pipe has three sections, a first evaporator section 30 where the liquid absorbs the heat from the environment, at one end of the enclosure 29 a second intermediate adiabatic section 31, and a third section 32 for condensation of the liquid at the other end where, as a result of the condensation, the liquid returns the heat absorbed in the evaporator section 30 to the environment. After its condensation in the third section 32, forming a condenser, the fluid in condensate state returns to the first section 30, forming an evaporator, as a result of the forces of gravity when, as in the case of FIG. 18, the condenser is located above the evaporator, or as in the case of FIG. 19 of the capillary heat pump, as a result of the capillarity developed in a porous medium indicated at 34, which covers the inner wall of the enclosure 29. The return could also be accomplished by the effect of other appropriate forces, such as centrifugal forces. The capillary network can be produced in different forms. It can be sintered, formed by layers of fabric or mat of metallic films, or be formed by axial or circumferential grooves in the inner face of the enclosure. The two modes of return by gravity and by capillary force can also be combined in one heat pipe. It is also possible to design a heat pipe having two condenser sections 32, one at each end of the enclosure, the evaporator section 30 then being located between the condenser sections as can be seen in FIG. 20, or a heat pipe with two evaporator sections and one condenser section between the two evaporator sections.

With reference to FIGS. 6A and 6C, several possibilities of design of a rectifier bridge as indicated at 9 in FIGS. 1 to 3 will be described, which possibilities are made possible by the use of heat pipe cooling devices according to the invention. In comparison to the rectifier bridge according to the prior art, with heat sinks, carriers of electronic elements 37 for rectifying the current generated in the windings of the stator, in the form of a single plate covering the entire available area represented by the shaded area in FIG. 4, the new design according to the invention of the heat sink has the advantage clearly illustrated by the figures that the support can be in any form, and instead of being a single part, it can be broken down into a plurality of support elements the shape of which can vary and is adaptable to the design data of the environment.

These heat pipes have a very high thermal conductivity that achieves the advantage of a good transfer of the heat from the heat source to the cool source. Moreover, the portion of contact between the condenser section and the vaporization section of the heat pipe is advantageously isothermal, which makes it possible to standardize the temperature in the part in which it is introduced, thus eliminating the residual thermo-mechanical stresses.

The walls of the enclosure 29 of the heat pipe are metal and the working fluid is chosen based on the nature of the walls forming the enclosure, the performances sought and the range of working temperature of the heat pipe.

Depending on the nature of the coolant fluid, to avoid failures such as oxidation, walls with multiple metal layers can be provided.

For example, steel with copper plating on the inside can be used, and water can be used as working fluid. Such is the case for the form of embodiment of FIG. 23, described below, with respect to the face 133 of the shaft 2, or as an alternative, the tubular wall 14 of FIG. 14.

In FIGS. 6A to 6C the coolant fluid is water and the walls of the enclosure of the heat pipe are copper or nickel. As an alternative, the coolant fluid is methanol and the walls of the enclosure of the heat pipe are copper, stainless steel or nickel. As an alternative, the working fluid is ammonium hydroxide and the walls of the enclosure are nickel, aluminum or stainless steel.

FIGS. 6A, 6B, 6C represent three views, cross section, side and top, respectively, each with variations, of a first type of solution, of a device for rectifying the current generated in the winding of the stator in the form of a rectifier bridge assembly placed at the rear of an alternator or an alternator-starter. The electronic rectifier elements designated by reference 37, such as diodes or MOSFET transistors or electronic chips, which dissipate the calorific power that must be evacuated, are inserted inside a support element 38 made of a thermally conductive material, such as metal, or installed thereon. In the example shown, two diodes 37 are inserted in a support element 38 in the form of a plate such as aluminum, of small size. The support element 38 can be attached, for example, by means of support columns 40 on the rear bearing 6. The support element or component 38 has recesses or holes in which are inserted one, or as in the example shown, two heat pipes 42 which extend inside the support plate 38 along the longitudinal edges of the plate, with the diodes 37 disposed between them. The two heat pipes 42 extend in opposite directions beyond the transverse edges of the support 38 until they are above the adjacent axial openings 12, which are provided in the rear bearing 6, as clearly illustrated in FIG. 6C.

Thus, according to one characteristic of the invention, at least one heat pipe 42, 43 extends above an adjacent opening 12 for a better evacuation of the heat.

In this form of embodiment, to improve the cooling even more, each projecting portion 43 of a heat pipe 42, situated above an axial opening 12, carries a plurality of heat dissipating fins 45, which are oriented parallel to each other and are therefore located in the flow of cooling air flowing through this opening. The support element 38 is also situated above an opening 12 for better cooling. The fins can be of rectangular cross section, pointed or other shape. The fins can be intersected to form a honeycomb network.

As an alternative, the fins are replaced by studs of advantageous profile, such as in the form of a water drop. In general the heat pipe advantageously has a plurality of heat dissipation projections.

It is the same in the other figures.

Figure 1:
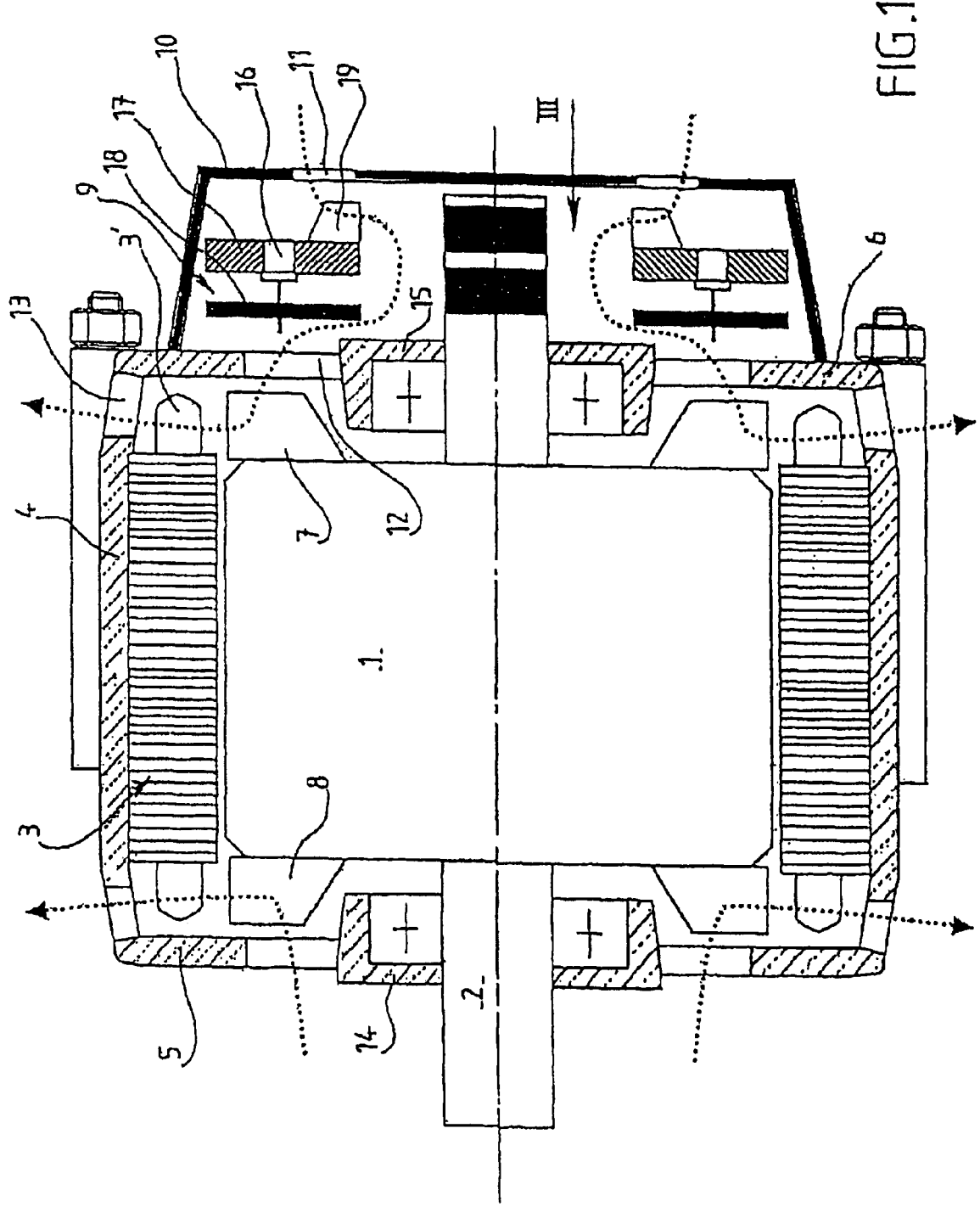
FIG. 1 is a diagrammatical view, in axial cross section, of a rotating electrical machine according to the prior art.

It will be understood that the fins 19 of FIG. 1 are eliminated by increasing the performances of the rectifier device or bridge and by economizing on material so that there is more space at the rear bearing 6.

The solution is therefore simple and economical.

The compactness of the device 42, 43, 38 for cooling the electronic elements 37 will also be appreciated, as well as the fact that it is protected by the cover 10 of FIG. 1, of an openwork design to allow passage of air.

This cooling device is less fragile than the one from the document U.S. Pat. No. 4,295,067, and is more aerated.

Furthermore, it takes advantage of the presence of the fan 7 of FIG. 1, creating a forced flow of the cooling fluid, in this instance air, passing through the openings 12, the louvers 13, the openings 11 of the cover 10 and the cooling device.

In FIG. 1 the fan 7 is of the centrifugal type. As an alternative, the fan 7 is of the centripetal type so that the louvers 13 are suction louvers for the cooling fluid and the openings 12 are recirculation openings for the cooling fluid, the circulation of the air being in reverse direction. In this case the heat pipe(s) of the cooling device are then situated above a louver 13, the cooling device then being carried by the outer periphery of overall axial orientation of the rear bearing 6.

The louvers 13 and the openings 12 constitute passages for the cooling fluid, in this instance air, in forced circulation by at least one fan 7, 8.

The invention takes advantage of the passages 12, 13 made in the housing.

More specifically, according to the invention, the rotating electrical machine comprising a cooling device by forced flow of a cooling fluid such as air, through passages 12, 13 in the housing by means of a fan 7, 8, is characterized in that the heat pipe pertains to the rectifier device and extends by its condenser section into said flow of the cooling fluid.

According to one characteristic of the invention, the condenser section extends in front of, advantageously in part, at least one passage of the housing.

This condenser section has at least one projection, such as a fin or a stud, in front of said passage.

Of course the housing 4, as an alternative, has a water cooled front bearing.

As an alternative, the housing 4 has more than two parts, for example three parts, to wit, a front bearing and a rear bearing extending on either side of a middle part carrying the stator 3.

This middle part can if necessary be water cooled.

All combinations are possible.

It will be observed that in all cases the heat pipe or heat pipes are less fragile because they do not have elbow sections extending into perpendicular planes as in FIGS. 9 to 14 of document U.S. Pat. No. 4,295,067. Moreover, the condenser section is adjacent to the rear bearing 6.

According to the foregoing description of heat pipes, with reference to FIGS. 18 and 19, the evaporator section of the heat pipes 42 is disposed inside the support 38 near the diodes 37 so that the heat dissipated by these diodes can be absorbed by the vaporization of the coolant fluid and transferred to the outer section 43 that constitutes the condenser section. Obviously, the number and shape of projections, in this instance fins 45, as well as the heat pipe devices and diodes, are variable. It will be observed that the support 38 also has fins disposed in front of the opening 12 to better cool the support 38.

It will be observed that the fins 45 allow better evacuation of the heat. These fins, in general the projections 45, are installed so that they are well placed at the openings 12.

This is made possible by the fact that the size of the support 38 can be reduced.

It will be observed, thanks to the circulation of the cooling fluid, in this instance air, that the cooling device is self-cleaning. In particular, its fins do not risk becoming fouled, unlike the unprotected ones from the document U.S. Pat. No. 4,295,067.

In general there is a wide choice for installing the condenser section and thus take advantage of the areas most favorable to cooling.

Thus according to another alternative, the condenser section, that is the cool source of the heat pipe(s) can be placed above the supports 38, but always in the air flow passing above the support in the way indicated by the arrow in FIG. 1. These supports are advantageously installed above openings 12.

As a result of the invention, there are numerous possibilities to make the support 38 advantageously a thermal conductor so that it can be split up.

Thus FIGS. 7A and 7B illustrate another version of embodiment of a heat sink according to the invention, which includes a plurality of support elements 38 that are small in size, each advantageously parallelepiped in shape and sized to allow the insertion of a single diode 37 in chip form. The diode occupies the upper part of the element 38 while the lower part has a hole 47 with rectangular transverse cross section in the example shown, and is intended for the passage of a heat pipe 49 that forms an assembly extending through all of the supports 38, as can be seen in FIG. 7A, and passes above the axial openings 12 of the rear bearing. The portions of the heat pipe 49 situated inside the supports 38 under the diodes 37 constitute evaporator sections, i.e., heat sources, while each portion 51 above an opening 12 constitutes a condenser section, i.e., a cool source. This area advantageously includes a plurality of projections, in this instance heat dissipation fins 53, advantageously installed above an opening 12.

Obviously, producing the heat pipe 49 in the form of a tube on which supports 38 in the form of small plates, each carrying a diode 37, can be attached, could also be considered.

The heat pipe can serve as support.

Thus FIGS. 8A and 8B illustrate yet another possibility of constructing a heat sink according to the invention. In this case, four rectifier diodes 37 are disposed on a heat pipe 55 in the form of a cross with two parallel transverse arms 56, each carrying two diodes 37. The part of the heat pipe that carries the four diodes 37 constitutes the heat source of the heat pipe, while the cool source 57 is in the part forming the strut of the cross shaped heat pipe. The area forming the cool source advantageously has a plurality of heat sink fins 58 installed advantageously in an environment of forced convection, the fins 66 being advantageously placed above intake openings 12 or intake louvers 13 according to whether the fan 7 of FIG. 1 is centrifugal or centripetal.

It should be noted that in the forms or alternatives of embodiment of a heat sink pertaining to a rectifier device according to the invention, which have just been described with reference to FIGS. 6 to 8, the supports of the diodes and/or the heat pipes are attached to a support part, if necessary directly the rear bearing, by any appropriate means of attachment, such as support columns 40 as in FIGS. 6A and 6B.

Thanks to the invention, the electronic modules can be simplified and thus the fins 23 of FIG. 5 can be eliminated.

FIG. 9 is a cross sectional view of an external electronic module for an alternator-starter having a cooling device according to the invention. In this module, the electronic elements 59 are mounted on an electronic substrate 60 mounted on a thermally conductive mechanical support 62. Inserted in this support 62 are one or more heat pipes 64 the evaporator section of which is located beneath the electronic elements 59 to absorb the heat produced by them. This heat is transferred to the outer part of the heat pipe which constitutes the condenser section and advantageously carries heat sink fins 66 that are advantageously placed above intake openings 12 or intake louvers 13, depending on whether the fan of FIG. 1 is centrifugal or centripetal.

As an alternative, the heat pipe or heat pipes 64 can extend out of any side of the mechanical support 62. For example, one heat pipe 64 can extend out of one of the support sides 62 and a second heat pipe can extend out of the other side. Projections, in this instance heat sink fins 66, can also be placed on the thermally conductive mechanical support 62.

By using at least one additional heat pipe, the other components of the machine can also be cooled, such as the housing, the stator and/or the rotor. The bearings 14 and 15 of FIG. 1 are also well cooled and thus provided for.

In general, other heat pipes can be placed near heat sources of the machine and thus increase the power thereof. As an alternative, the heat pipes can also be used as fans so that the front fan can be eliminated, for example, or fans can be made to perform better, for example with two series of blades, one of which is composed of fins, forming blades, pertaining at least in part to the heat pipes.

These heat pipe blades are installed below the openings 12 and louvers 13.

Obviously, in FIGS. 6 to 9 the fan 7 can be a fan with two series of blades. This can be a dual fan of the type described in the document FR A 2 741 912, that is, including at least two parts having at least two superimposed end plates and at least two sets of blades angularly offset from each other.

Figure 29:
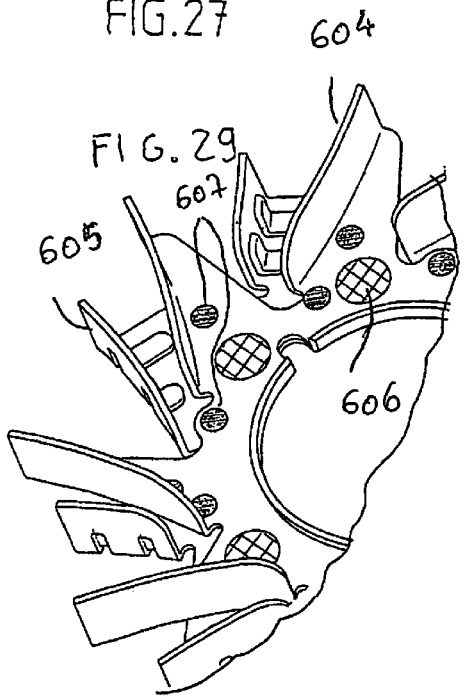
FIG. 29 is a partial view in perspective of a fan with two series of blades. Description of Preferred Examples of Embodiment of the Invention The invention takes advantage of the cooling device that is a heat pipe system, i.e., a system that provides for the transfer of heat from a heat source to a cool source in accordance with a closed cycle of evaporation and condensation of a coolant fluid circulating inside a hollow part such as a tubular type.

Such a fan can be partially seen in FIG. 29. This view is a partial view in perspective of a fan adjacent to the rear bearing.

Visible at 604 is one blade of the first series of blades and at 605 one blade of the second series of blades. 606 references an area for attaching one of the parts of the fan to the rotor of the alternator, and at 607 are areas of attachment between the two parts, metal in this instance, of a fan of the type described in the abovementioned document FR A 2 741 912 to which reference will be made.

Advantageously one of the series of blades includes at least one heat pipe.

As a result of the increase in the number of blades, the load losses are decreased at the rear of the machine and the air flow is increased, thus promoting the cooling of the electronic elements 37, 59.

Thanks to the invention, the machine can be more powerful and/or less noisy.

Figure 10A:
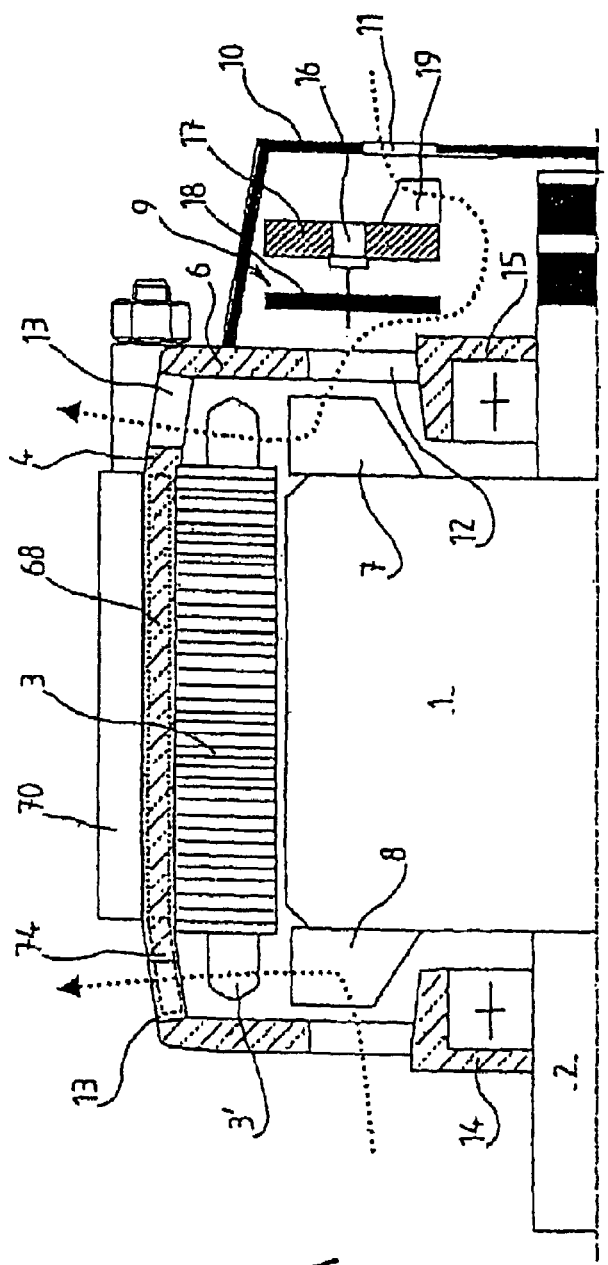
FIGS. 10A and 10B are views respectively in axial cross section of a rotating electrical machine according to FIG. 1, the stator of which is provided with a cooling device according to the invention, and a detail of the cooling device.

Thus FIG. 10A shows another application of the principle of cooling by heat pipe according to the invention, to wit, the cooling of the stator of a rotating electrical machine of the type, for example, shown in FIG. 1. The same references are used in FIG. 10A as for FIG. 1 to designate identical or similar components.

To understand the problem resolved by the cooling device according to FIG. 10A, it will be remembered that during the operation of the machine consisting of an alternator as in FIG. 1, an electric current is induced in the windings 3' of the stator 3, which causes said stator to heat up. Moreover, electromagnetic phenomena related to the creation of this induced current also cause losses in the different components of the machine, which are transmitted in particular to the housing 4 and causing the heating thereof. The flow of electricity generated by the machine depends directly on the heating. The greater the heating of the stator 3, the smaller the flow of electricity. The stator must therefore be cooled in order to increase the flow of electricity and the performance of the machine, which is accomplished in the case of the central part of the housing 4 situated between the louvers 13 pertaining to the front and rear bearings. This central part is installed above the body of the stator 3 in the form of laminations. This central part constitutes the major part of the outer periphery or circumference of the housing. It will be remembered, as mentioned above, that the front and rear bearings are hollow and the louvers 13 are made in the outer periphery of these bearings and pertain to the outer periphery of the housing. In one form of embodiment the central part of the housing is therefore composed partly of the outer periphery of the front bearing and partly of the outer periphery of the rear bearing, which are thus disposed on either side of the central part of the housing. The louvers are made as an alternative in the central part.

Figure 10B:
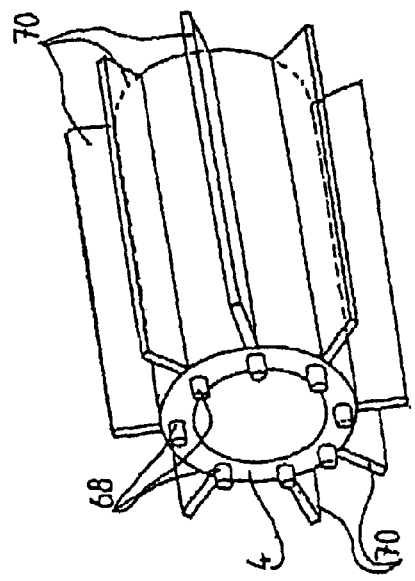

To that end, one or advantageously multiple heat pipes 68 in any form are inserted inside the housing 4, more particularly at least in a major part in the central part thereof, in which they extend, in the example shown, parallel to the axis of the machine over practically the full length of the stator 3. As shown in FIG. 10B, the heat pipes are advantageously angularly uniformly distributed around the circumference of the housing 4, these heat pipes providing the evacuation of the heat to the exterior, in an environment of natural or advantageously forced convection. To that end, the invention can provide for the disposition of axial heat sink fins 70 on the outer face of the bearing to increase the cooling capacity.

FIG. 10A again shows a possibility of increasing the cooling power of the heat pipes 68. As is indicated by the dotted lines, at least some heat pipes can be extended according to one characteristic of the invention, into the radial louvers 13 of the machine on the side of the front bearing 5 or rear bearing 6 or even on both, so that the condenser section 74, that is, the cool source for the heat pipes 68, is located in these radial louvers 13 of the bearing. This makes it possible to use the air flow from axial openings of the front and/or rear bearings that exits radially through the louvers 13 to cool the outer parts of the heat pipes and thus evacuate the heat. As an alternative, at least one of the fans 7, 8 is of the centripetal type so that the air flow enters by the louvers 13 and leaves through the openings 12.

This arrangement can be combined with the fact that the heat pipe or heat pipes installed at least in part in the louvers 13 also carry at least one electronic element 37, 59. As an alternative, this arrangement is combined with that of FIGS. 6 to 9 so that at least one heat pipe is provided for a louver 13 and at least one heat pipe for an opening 12.

According to a variation of the heat pipe cooling device for the stator, one or more heat pipes could even be placed inside the body, in the form of laminations, of the stator 3 through which the armature winding 3' passes with the help of slots that said body has for that purpose. These windings 3' extend out on either side of the body of the stator to form what are know as lead-outs.

The heat pipes could be oriented axially and/or radially.

FIG. 11A shows the application of the principal of cooling by heat pipe for the cooling of the field rotor of a rotating electrical machine such as an alternator or alternator-starter of the type shown in FIG. 1. The same references are used in both figures to designate identical or similar parts or components.

In this case the rotor advantageously has the form described in the document WO 02/054566.

Figure 12A:
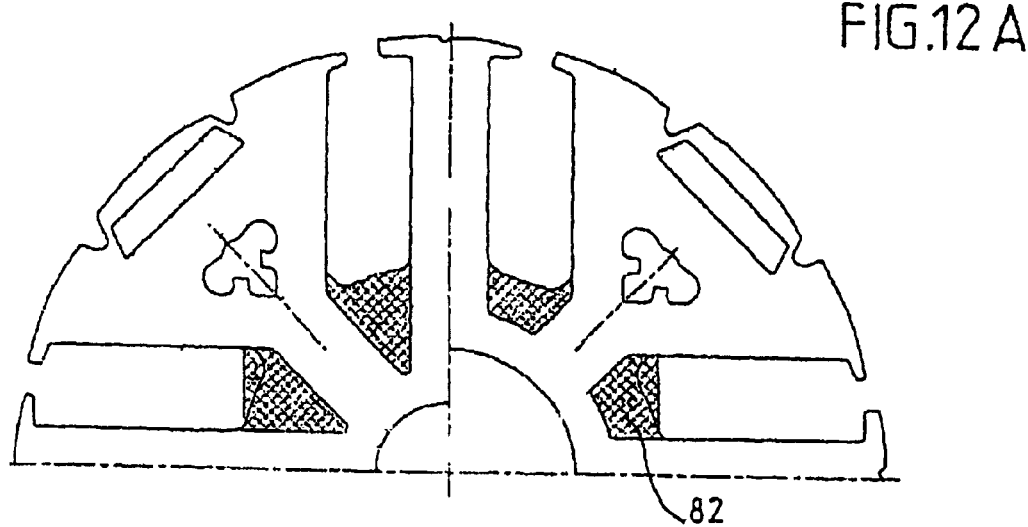
FIGS. 12A and 12B are views in transverse cross section of a rotor of a machine according to FIG. 1, provided with a cooling device according to the invention, arranged in the slots of the rotor's windings.

This rotor therefore includes laminations in which field windings and permanent magnets are alternately included. To do this the field windings are wound around protruding poles cut in the rotor's laminations, while the permanent magnets are received in recesses made in the laminations. These recesses are closed by retaining parts equipped with a non-magnetic part. FIGS. 12A to 13 show such protruding poles alternating with the trapezoidal shaped recesses for the magnets. Tie rods pass through the laminations to link together the retaining parts as can be seen in document WO 02/054566, to which reference can be made for further details.

In the form of embodiment of the invention shown in FIG. 11A, one or more heat pipes 76 are inserted into the rotor 1, in this instance into its laminations, or as an alternative between the axial orientation teeth of the magnet wheels of a claw-pole rotor. The heat pipes, which in the example shown extend parallel to the axis of the rotor and can be in any form, go back out toward the front part of machine at 78. Obviously, the heat pipes can also go back out toward the rear part. The evaporator section of the heat pipe or heat pipes 76 inside the rotor 1 absorbs the heat generated therein. The calorific energy is then carried via the heat pipe toward the area 78 outside the rotor, to be evacuated advantageously by means of the passage of air from the intake louvers 12 of the bearing. It will be noted that the outer part 78 of the heat pipes that constitutes the condenser section is situated, in the example shown, at the radially internal edges of the blades of the corresponding fan 7 or 8 which are better cooled.

As an alternative, the heat pipes are installed in the central part of a salient-pole rotor or claw-pole rotor beneath the field winding(s). As variations, the heat pipes are installed in the teeth of the magnet wheels of a claw-pole rotor.

As an alternative, the heat pipes can extend both toward the front and rear of the machine. In this case, it is advantageous to use heat pipes like those represented in FIG. 20, that is, heat pipes the two ends of which are configured as condenser section, the evaporator section being located between them. This section is then located inside the rotor.

FIG. 11B illustrates one possibility of increasing the cooling capacity of the device according to FIG. 11A, by placing blades 80 of appropriate configuration on the free ends 78 of heat pipes 76, which constitute condenser sections, which could constitutes a second series of blades on the fan. This would make it possible to benefit from the advantages of fans with two series of blades as described in the French patent application FR A 2 811 556. The blade could be a part fitted on to the heat pipe or the condenser section 78 could be configured so as to form a blade.

Figure 12B:
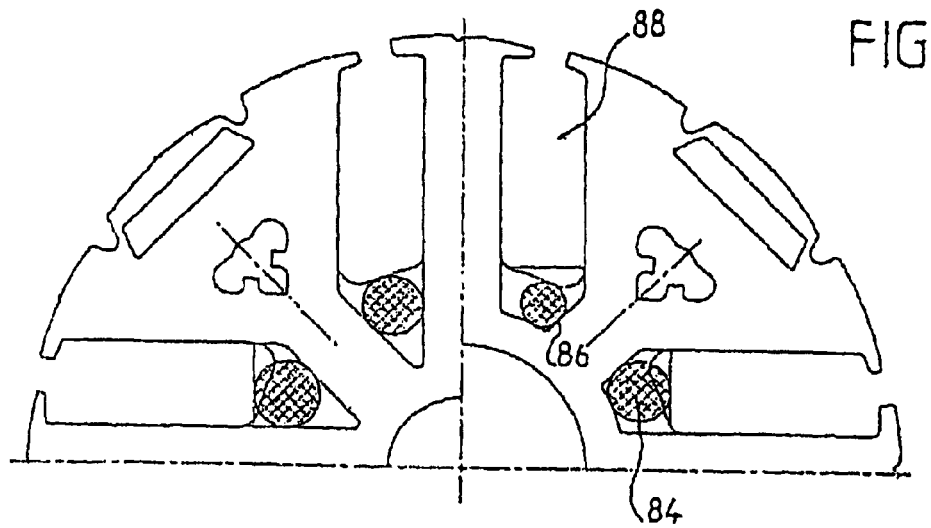
Figure 13:
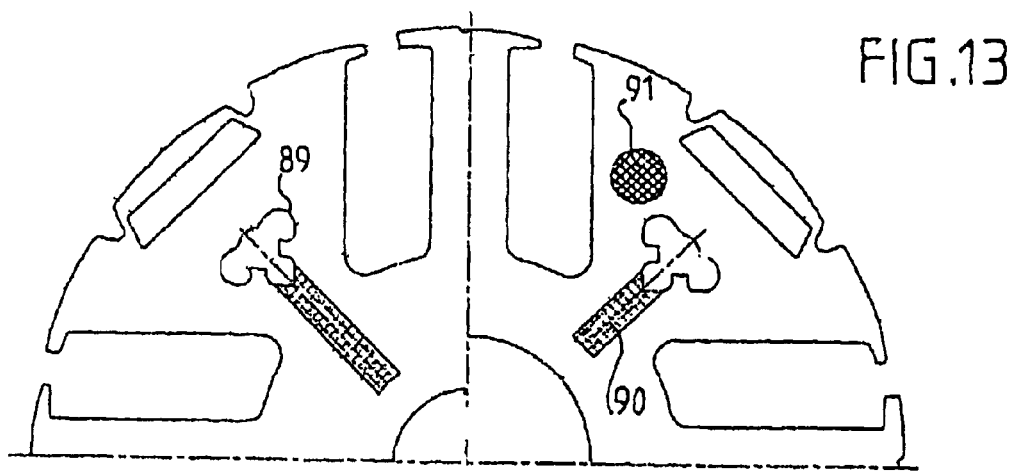
FIG. 13 is a view in transverse cross section of the rotor of a machine according to FIG. 1, provided with a cooling device according to the invention at the tie rods holding the rotor's laminations.

FIGS. 12A and 12B show another advantageous use of the principle of cooling by heat pipe according to the invention, for cooling the rotor of a rotating electrical machine, such as the abovementioned salient-pole rotor and recesses. These figures show two possibilities of cooling the rotor by disposing heat pipes 82, 84 in the bottoms 86 of slots 88 for receiving the windings of the rotor, said slots delimiting the salient poles (not referenced) in the form of an arm with retention head. It will be noted that for this purpose the bottoms 86 of the slots are configured so as to be able to receive the heat pipes which extend parallel to the axis of the rotor. The heat pipe could also be sloped to ensure a return by centrifugal force. In the case of FIG. 12A, each heat pipe 82 is configured so as to practically fill the whole bottom 86 of the slot. The shape of the heat pipe is therefore adapted to the shape of the bottoms 86 of the slots. In the case of FIG. 12B, the heat pipes have a circular transverse cross section, as do also the heat pipes 82 disposed in the bottom 86 beneath the area reserved for receiving the field winding.

FIG. 13 illustrates another possibility of cooling the rotor by disposing heat pipes 90 in axial cutouts, advantageously of rectangular shape, which extend radially from the orifices 89 provided for the tie rods that hold the rotor's laminations. The figure also shows by the reference 91 that heat pipes can be disposed at any appropriate place of the rotor, radially and axially, as already indicated in FIG. 11A.

FIG. 14 diagrammatically illustrates a heat pipe 92 that also serves as tie rod to hold the laminations, diagrammatically indicated as 94, and cooler. To that end the enclosure of the heat pipe is formed by a tubular wall 94, made of a strong material such as iron. The inner face of the tubular wall 94 has a capillary structure obtained, for example, by a grooved surface. Of course, the coolant fluid inside the enclosure is appropriate for the materials of the heat pipe. At its two ends, the heat pipe has an outer threading 95. The threaded parts emerge from each side of the laminations 93 in an end plate 96, for example of aluminum, constituting a retaining part as mentioned above and are secured in said end plates by nuts 97 that cooperate with the threads 95.

Obviously a heat pipe could be provided anywhere in the rotor, axially oriented or sloped with respect to the axis of the rotor, or even radially, as will be explained further on.

FIGS. 15A and 15B illustrate another advantageous application, according to the invention, to a rotating electrical machine whose stator winding is formed by electrically conductive elements in the form of pins as represented in the figures. By configuring at least some of the pins 98 as heat pipes, the invention proposes a possibility of very efficient cooling of the stator by ensuring the direct cooling of at least some pins 98 received in slots of the body of the stator. The tubular form of the pins configured as heat pipes does not require an increase of the transverse cross section of the pins because the cooling results in a decrease in the electrical resistance which compensates for the decrease in transverse cross section due to the tubular nature of the pins.

These electrically conductive pins 98 can have a circular or rectangular or other cross section and can be mounted in place of pins of the type described in the document WO 02/50976 to which reference can be made for additional details.

As alternatives, the heat pipes, in the form of bars, replace the conductive elements of the type in FIG. 11 of the document EP 0 881 752 or of the type described in the document U.S. Pat. No. 2,407,935, the slots made in the body of the stator for mounting the electrically conductive elements being radially oblong in shape and semi-closed, as can be seen in these documents. As an alternative, the slots are closed or open and subsequently reclosed.

FIGS. 16A and 16B illustrate one possibility of constructing a heat pipe cooling device according to the invention, which is particularly suitable for heat dissipating elements such as electronic elements that rectify the current generated in the windings of the stator, for example such as the MOSFET transistor, and electronic components used in power electronics place at the rear of the machine. These different forms of embodiment of the cooling devices can be used in the designs shown in FIGS. 6 to 8.

FIG. 16A is a cross sectional view along line XVIA-XVIA of FIG. 16B of the electronics stack composed of a heat dissipating MOFSET electronic rectifier brazed onto a heat pipe 101 that then serves as a mechanical and electrical support by allowing the currents required for the operation of the electronics to pass. Furthermore, it acts as a heat sink because the calorific power dissipated by the element 100 (a MOFSET type transistor, an electronic chip or other) is transferred via the heat pipe to the cool section of the heat pipe advantageously situated in an environment of forced convection such as the flow of air above intake openings 12 of the rear bearing 6 according to FIG. 1. As in FIGS. 6 to 8, heat dissipation fins 103 are placed parallel to the direction of flow of the cooling air in order to decrease the load losses. The advantage of this heat dissipating element device 100 directly on the heat pipes is the decrease in thermal interfaces and thus in improved cooling. Of course, the heat pipe 101 as well as the fins 103 can have any shape.

FIGS. 17A to 17C illustrate three solutions that allow electronic components to be brazed directly onto the heat pipe with a laser type technique. It should be noted that for these three solutions, only the evaporator section of the heat pipe is described, that is, the heat source section. The cool source section, i.e., condenser section of the heat pipe, could be the same as in FIG. 16B.

The solution shown in FIG. 17A shows a heat pipe 101 having a solid part 102, and beside said solid part, a hollow part occupied by the channel 103 through which the coolant fluid flows. The electronic rectifier element, such as a chip or diode 100, can easily be brazed by laser technology onto the solid part 102 of the heat pipe. The arrows indicate the laser rays.

Figure 2:
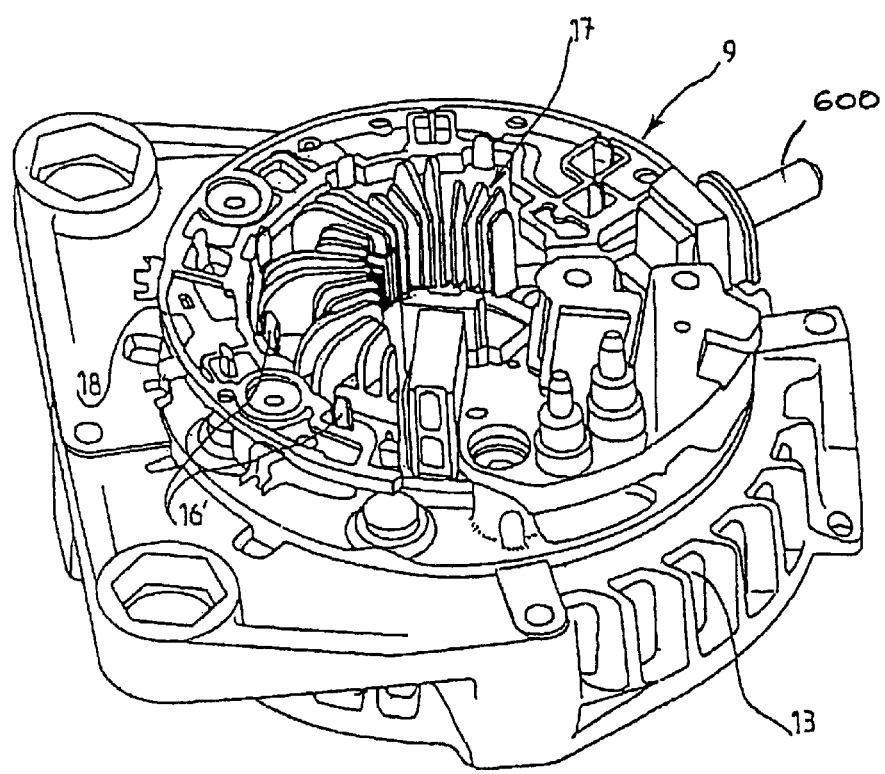
FIG. 2 is a view in perspective of a specific embodiment of a rectifier bridge of a machine according to FIG. 1.

According to the solution illustrated in FIGS. 17B1, 17B2, the heat pipe is constructed by assembling two separate parts 104a and 104b, that is, a first part 104a of lesser thickness in its middle part, onto which the chip 100 is brazed by laser type technology, and a part 104b in the form of a backing plate that is placed beneath the part 104a after the brazing. After assembly the two parts delimit an internal channel 105 that is hermetically closed except at a previously chosen location. Through that opening, the coolant fluid is injected under pressure into the channel 105. Said opening is then sealed closed. To provide for the return of the coolant fluid from the condenser section to the adsorption section, means forming a capillary network such as by a grooved surface, are provided in the inner face of both parts that delimit the channel 105.

The solution shown in FIGS. 17C1 and 17C2 is also based on assembling two separate parts to form the heat pipe support, to wit, a first part 106a in the form of a plate and a second part 106b, tubular with rectangular transverse cross section in the example shown. The interior of the part 106b constitutes the channel 105 for circulation of the coolant fluid. The chip 100 is first brazed with laser technology onto the plate 106a, then the plate 106a carrying the chip 100 is attached to the tubular part 106b, directly by brazing so as to ensure good thermal contact. As part of a single attachment, a thermally conductive grease could be advantageously added between the chip 100 support plate 106a and the part 106b forming the heat pipe per side effects, to ensure a good exchange of heat between the two parts.

Of course, as an alternative the brazing operations can be replaced by welding operations, advantageously of the laser type, or gluing, the glue being electrically conductive. In every case, therefore, a better transfer of heat is obtained between the electronic rectifier element and its mechanical and electrical support, such as the heat pipe or as an alternative a heat sink plate.

Herebelow various forms of embodiment of a heat pipe cooling device, applicable to a rotating electrical machine, are described. Obviously these forms of embodiment are only given by way of example to highlight the advantages achieved by the invention. Other possibilities of application could be considered without going beyond the scope of the invention. Thus, a heat pipe in the form of a plate could be placed around the bearing 4 of the machine.

Other possibilities of implementation of the invention could be considered, such as those illustrated in FIGS. 21 to 27.

FIG. 21 shows another version of implementation of a rectifier bridge, i.e., the rectifier device, constructed in accordance with the principle illustrated in FIGS. 6A to 6C. The version according to FIG. 21 is perfectly suitable for a bearing having axial openings 12 arranged along an arc of circle. The diode holder, always referenced 38, is formed by an arc-shaped plate of thermally conductive material, which carries five diodes 37 and is arranged in part, as in FIGS. 6C and 7A, above an opening 12 while the two heat pipes 42, also arc-shaped, extend, as well as the plate 38, to above the two adjacent axial openings 12. Each free end 43 constituting a condenser section carries a plurality of fins 45 that fit perfectly within the contours of the openings 12.

Figure 3:
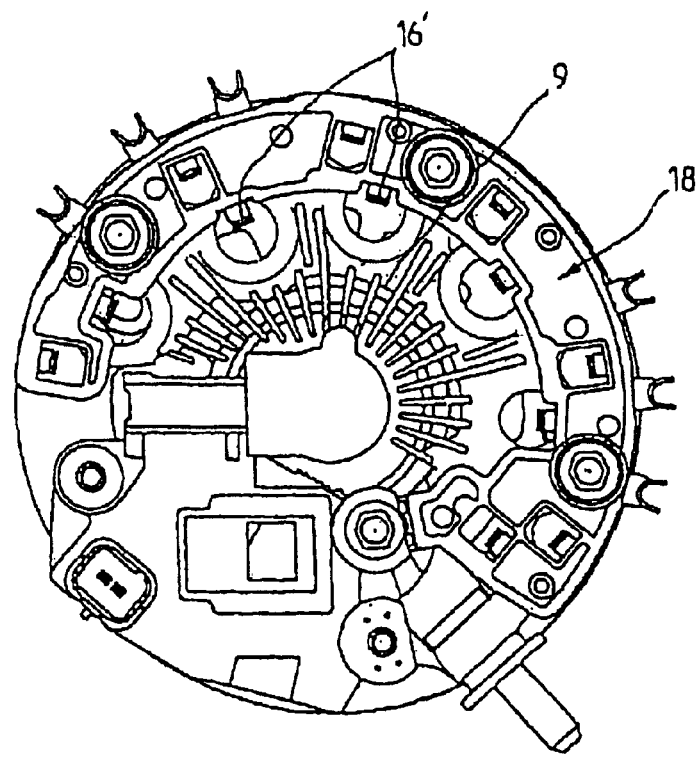
FIG. 3 is a view in the direction of arrow III of FIG. 2.
Figure 4:
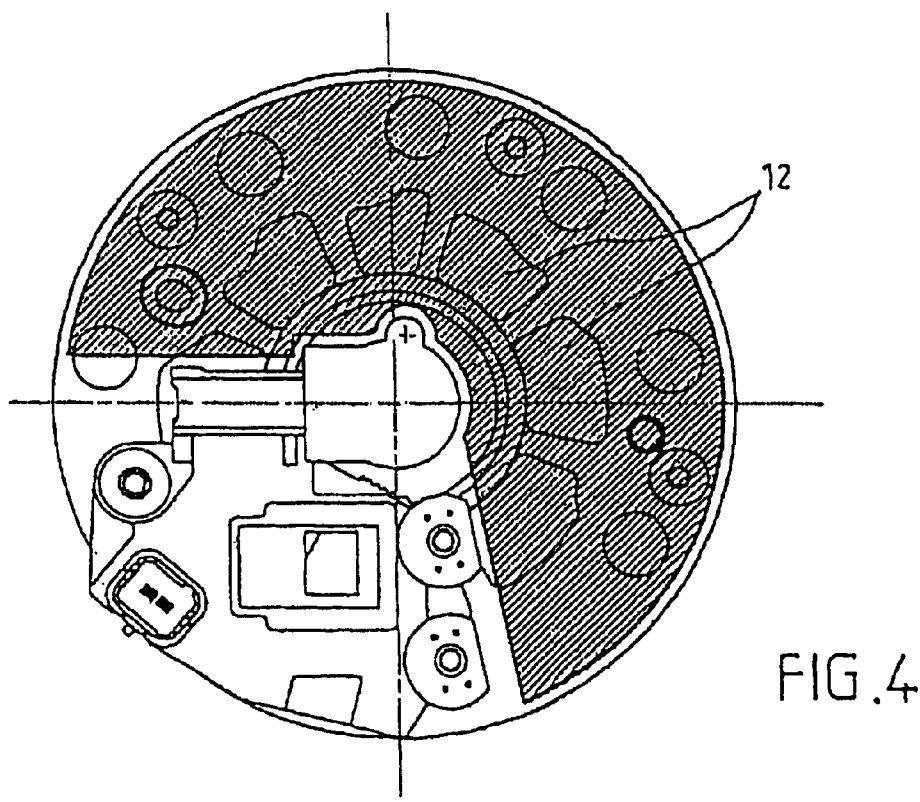
FIG. 4 shows the back of the machine of FIG. 3 without the heat sink and without the connector.

FIG. 22 is a view in perspective of a specific form of embodiment of a heat sink carrying positive diodes, pertaining to the rectifier device, constructed in accordance with the invention and intended to equip a rectifier bridge of the type shown in FIGS. 2 to 4 and occupying, for example, the shaded area of FIG. 4 above the axial openings 12. The heat sink according to FIG. 22 includes, as support for the diodes, a plate in the shape of an arc of circle designated by the reference 110 and, on either side of said plate, finned devices 111, 112. The support plate 110 and the fins extend at least above one opening 12. The plate 110 includes, distributed along its outer periphery, six positions for installing diodes that are made, in the example shown, in the form of holes 113 for insertion of diodes by press-fitting. The support plate 110 has, close to its inner periphery, two positions for attaching the heat sink on the rear bearing of the machine. These positions each include a hole 115 through which a mounting column passes, and projecting from the upper face of the plate, a tubular end fitting 116. The inner peripheral edge carries six cooling fins 117 that extend radially toward the axis of the machine.

Inserted into the support plate 110 are two heat pipes 119, 120 each of which extends between three diode installation positions 113 and one attachment position 115. The part of each heat pipe 119 and 120 that is engaged in the plate 110 is appreciably rectilinear, extending generally in the longitudinal direction of the plate. This internal part constitutes the evaporator section of the heat pipe. The internal part extends to the exterior by an external part 122 that is appreciably rectilinear in the example shown and which constitutes the condenser section of the heat pipe. Each external areas 122 carries a multitude of parallel cooling fins 124 which constitute the cooling device 111 and 112. The unit formed by the fins 124 is approximately triangular in shape, decreasing in width in the direction going away from the diode support plate 110 while being curved at its outer periphery so as to correspond to the rear bearing on which the heat sink of FIG. 22 is attached. Because of this configuration of the heat sink, it can fit within the contour of the shaded area of FIG. 4.

The support plate 110, constituting a support device, is in this instance made of metal, e.g., aluminum.

It should also be noted that each heat pipe has an elbow section 123 between its two rectilinear parts constituting evaporation and condenser sections.

It should be noted that the holes 113 for installing the diodes and the holes 115 through which the mounting columns pass can be arranged differently. Thus, two diodes could be installed at the positions specified for the mounting columns, two diode installation holes being then reserved for these columns for attaching the heat sink to the rear bearing.

As an alternative, of course, as shown in dashed lines, the plate is divided into two different parts, each part carrying respectively the positive diodes ad the negative diodes. The same can be done in FIG. 21.

FIG. 23 diagrammatically illustrates several possibilities of use of the heat pipe cooling principle, in addition to the examples already described.

FIG. 23 is a view in axial cross section of a rotating electrical machine such as the one represented in FIG. 10A, but which shows, in addition, attached to the end of the rotor shaft 2 a known type of pulley, referenced 126, and intended either to drive in rotation the shaft 2, of steel for example, or to drive a thermal engine such as by a belt drive. One feature of the machine of FIG. 23 is the fact that the shaft 2 is hollow and configured to comprise a heat pipe the evaporator section of which is axially situated in the rotor while the outer part 128 constitutes the condenser section of the heat pipe. This outer section at the end of which the pulley 126 is fitted carries, between said pulley and the bearing 14, a plurality of radial cooling fins 129. As indicated by dot-and-dash lines, a fan wheel, with blades 130 if necessary, could be provided on the outer part 128 of the shaft 2. The fan 130 provides or improves the flow of the cooling fluid at the front bearing, indicated by the dashed line with arrowhead. In this case, cooling fins extending parallel to the axis of the shaft 2 could also be provided.

The shaft 2 could be tubular of constant thickness and made of an appropriate material such as steel. The internal space 132 of the shaft could also be made to have the form shown by dashed lines. It will be noted that the space 132 narrows in the radial direction of the shaft toward the condenser section 128. The slope of the face 133 that delimits the internal space 132 thus facilitates a return of the coolant fluid in the condensate state, by the centrifugal force caused by the rotation of the shaft 2.

FIG. 23 also shows a heat pipe device 134 that is inserted in the rotor 1 and is sloped with respect to the axis of the machine to ensure the return of the coolant fluid in condensate state to the evaporator section under the effect of centrifugal force. To that end, the evaporator section referenced 135 is radially farther away from the axis of the machine than the condenser section at the outside of the rotor. In the example shown, the heat pipe device is of type shown in FIG. 20, that is, it has an evaporator section 135 axially disposed in the middle of the rotor and two outer condenser sections 136, one at each end of the rotor. As also shown in FIG. 23, each condenser section 136 of the heat pipe is engaged in an end plate 137, advantageously of aluminum, which covers the front outer face of the rotor 1. The end plate 138 can carry the fan intended to create the flow of the cooling fluid indicated by the dotted line with arrowhead. The fan could be constructed in the form of one separate part, or in the example shown, it could be made as a unit with the end plate molded with its blades 138 thereon.

FIG. 24 also illustrates the possibility of cooling the rotor by providing radially oriented heat pipes 140 therein, the evaporator section 141 being located inside the rotor 1 and the condenser section 142 being located at the outer periphery of the rotor 1 in the space 143. In order to ensure effective cooling, the condenser section of a heat pipe 140 could be made in the form of a hollow, tubular element 144 extending over the largest part of the periphery of the rotor, symmetrically with respect to the body of the heat pipe 140, in the peripheral direction, as can be seen in FIG. 24, or in the form of a sleeve as indicated by the dotted lines in FIG. 23 and referenced 145, which encloses the rotor.

FIG. 23 also illustrates the possibility of providing in the body, in the form of laminations of the stator 3, or directly in the slots of said body used to accommodate the windings 3' of the stator 3, axial heat pipes which, as can be seen in the figure, exit at 147 at both ends of the stator. These heat pipes are installed in the body of the stator, advantageously at the bottom of the slots, for example of the semi-closed type.

These heat pipes could be distributed uniformly around the stator and could be provided radially at the internal and external levels, i.e., radially on either side of the stator winding 3'. As an alternative, the condenser section 147 of the heat pipe extends to the radial louvers for air backflow that are in the housing 4, more particularly the front and rear bearings thereof as previously described. In this figure the louvers are not referenced for reasons of simplicity.

Figure 26:
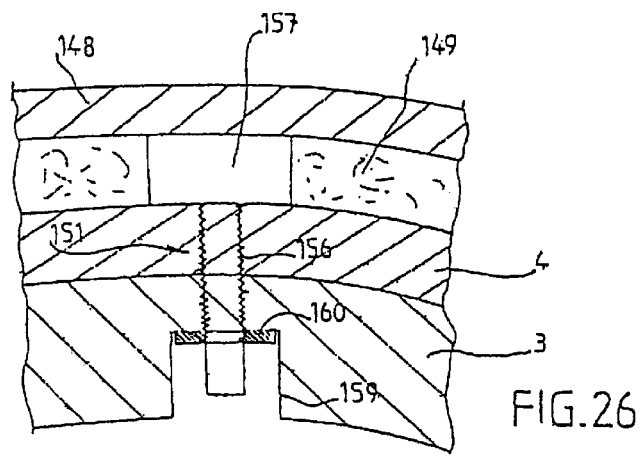
FIG. 26 is a detailed view in larger scale of various possibilities of heat pipe cooling of the stator of a rotating electrical machine, similar to the device represented in FIG. 25.
Figure 27:
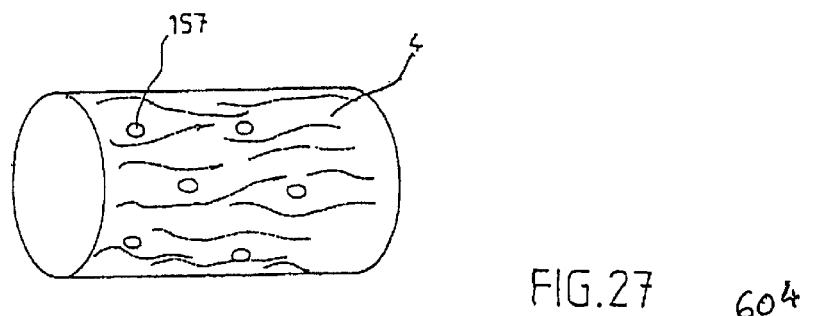
FIG. 27 is a diagrammatical view in perspective on the peripheral face of the bearing 4 provided with heat pipe cooling means according to FIG. 26.

FIGS. 25 to 27 illustrate several other possibilities for cooling the stator that are made possible through the use of an additional heat pipe cooling device.

First of all, a water pocket or cavity could be provided around the outer peripheral part of the housing 4 (between the front and rear bearings), if necessary by replacing the fins 70 of FIG. 10A. Said water pocket could be made by placing around the bearing, at a certain radial distance therefrom, a sleeve 148, thus obtaining an annular space 149 between the bearing 4 and the sleeve 148 in which the cooling water is made to circulate. To improve the cooling effect, radial heat pipes like the ones referenced 151 could be used, the evaporator section of which could be located inside the laminations 3 of the stator, for example as indicated at 152, or just in the bearing 4, and of which the condenser section 154 extends into the annular space 149 through which the cooling water flows. Of course, the heat pipes could also exit directly into the surrounding air in one version of a machine with no water cavity. FIG. 26 shows that a radial heat pipe 151 could be made in the form of a rod 156, which may or may not be threaded, which can extend radially into the laminations of the stator 3 and the other end 157 of which, if necessary in the form of a screw head, is disposed in the annular space 149 through which the cooling water flows and therefore in contact with the water. FIG. 26 also illustrates the possibility that the heat pipe could extend into the slot 159 where the conductors (not shown) of the stator winding 3' are received. Also or in addition, an axial heat pipe 160 could be provided at the bottom of the slot 159. The purpose of FIG. 27 is to show that the condensation end 157, if necessary made in the form of a screw head 157, could be configured so as to cause turbulence in the flow of cooling water, which improves the transfer of the heat dissipated by the condenser section, to the cooling water.

Of course, other possibilities and alternatives of implementation of the principle of cooling by heat pipe could be foreseen. It is also obvious that the different applications of this principle of cooling by heat pipe that have been described above and are represented in the figures could be used separately or in combination with each other.

The invention is obviously applicable, as mentioned above, to a reversible machine called alternator-starter, which functions as an alternator and starter as described, for example, in the document WO 01/69762 to which reference can be made for more details. FIGS. 1, 3 and 4 of this document show the structure of a conventional claw-pole rotor.

As a variation, the alternator is a single phase type and therefore includes only one stator winding.

The heat pipes can be mounted in the front or rear bearings of FIG. 1 to cool the roller bearings of the shaft 2 as in the form of embodiment of FIG. 23, also making it possible to cool the field winding(s).

In general, thanks to the invention the power from the rotor and stator windings can be increased.

Figure 28:
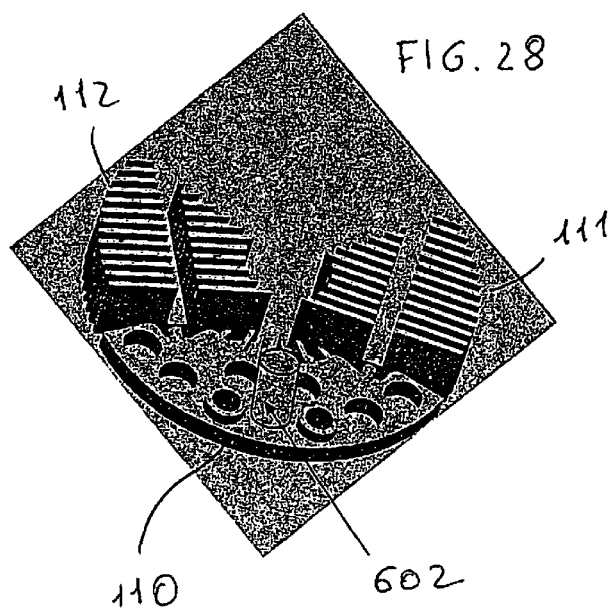
FIG. 28 is a similar view to FIG. 22 for another example of embodiment.

As an alternative, as can be seen in FIG. 28, the plate 110 of FIG. 22 carries the B+terminal, intended to be electrically connected to the positive terminal of the battery and to the vehicle's on-board power supply system. In this instance this terminal is molded with the plate 110, aluminum in this instance. This terminal 601 corresponds to the terminal 600 of FIG. 2. The terminal 601 can be provided with threading.

As an alternative, the plate 110 carries the terminal, called B−, intended to be connected to ground.

As an alternative, it is the heat pipe itself that carries one of these B+, B− terminals.

In the figures, at least one internal fan 7, 8 is provided, mounted in the housing 4 and integral with one of the axial ends of the rotor.

As an alternative, in a known way a fan outside the housing 4 is installed near the pulley of the alternator. The passages are then constituted by the openings 12 of the bearings 5, 6.

As an alternative, the fan is independent of the shaft of the rotor. This fan is driven by an electric motor as described in the document FR A 2 515 893. Advantageously, the electric motor is then installed near or inside the alternator.

The invention claimed is:

1. A rotating electrical machine, comprising:
    a housing comprising a front bearing, a rear bearing, and passages, and inside the housing a stator carrying at least one stator winding,
    a shaft,
    a rotor mounted rotatably inside the stator with the aid of the shaft supported on said front and rear bearings,
    a rectifier device provided with electronic elements for rectifying the current generated in the winding of the stator,
    at least one fan,
    means for cooling by forced flow of a coolant fluid through the passages of the housing with the aid of the fan, and
    means for cooling and evacuating to the outside the heat produced in the machine,
        wherein said cooling and evacuating means comprises:
            the coolant fluid, and
            at least one heat pipe comprising:
                a closed enclosure, in which circulates the coolant fluid capable of absorbing heat from the environment, through a first change of state, and releasing heat back to the environment, through another change of state,
                at least one evaporation zone for absorption of the heat through evaporation of the coolant fluid, and
                at least one condenser zone for restoring the absorbed heat through condensation of the coolant fluid,
        wherein the heat pipe belongs to the rectifier device, wherein the passages consist of axial openings of the rear bearing for passage of the coolant fluid, and wherein the condenser section of the heat pipe is located in the flow of the coolant fluid above at least one of said axial openings.

2. The machine according to claim 1, wherein the at least one condenser zone has at least one projection for dissipation of the heat in front of the passage.

3. The machine according to claim 1, wherein the fan has two series of blades.

4. The machine according to claim 1, wherein the closed enclosure is shaped like a tube.

5. The machine of claim 1, wherein the closed enclosure is shaped like a plate.

6. The machine according to claim 1, wherein:
    the electronic elements for rectifying the current generated in the winding of the stator are mounted on support means of a thermally conductive material, and
    at least one heat pipe that stretches between an area where an electronic rectifier element is installed in order to absorb the heat it produces, and the at least one condenser zone expands into said flow of the coolant fluid consisting of air.

7. The machine according to claim 6, wherein the support of an electronic rectifier element includes a recess in which the evaporator section of a heat pipe is located.

8. The machine according to claim 7, wherein the support of an electronic rectifier element is mounted on the evaporator section of a heat pipe so as to form a mechanical support device.

9. The machine of claim 6, wherein the support means comprise a plurality of support elements sized to allow the insertion of a single electronic element and in that the heat pipe forms an assembly extending though all the supports elements and passes above the axial openings of the rear bearing.

10. The machine of claim 6, wherein the support means comprise a single support element for the rectifier elements and in that two heat pipes are inserted in the support element and extend in opposite directions until they are above the adjacent opening which are provided in the rear bearing.

11. The machine of claim 6, wherein the heat pipe carries a terminal.

12. The machine according to claim 1, further comprising means of cooling the stator comprising at least one heat pipe lodged in the housing, by stretching parallel to the axis of the stator.

13. The machine according to claim 12, wherein:
the front and rear bearings are provided at their outer periphery with louvers for the flow of the coolant fluid, and the at least one heat pipe inserted in the housing expands into a radial louver, the part of the at least one heat pipe located in the louver comprising a condenser section.

14. The machine according to claim 1, wherein:
the stator has a body equipped with slots, and
the heat pipe is disposed in at least one slot of the body of the stator.

15. The machine according to claim 14, wherein:
the stator includes at least one stator winding formed by conductors in the form of pins disposed in the slots of the body of the stator, and
at least some pins are shaped like heat pipes.

16. The machine according to claim 1, wherein the shaft of the rotor is shaped like a heat pipe.

17. A rotating electrical machine, comprising:
a housing comprising a front bearing, a rear bearing, and passages, and inside the housing a stator carrying at least one stator winding,
a shaft
a rotor mounted rotatably inside the stator with the aid of the shaft supported on said front and rear bearings,
a rectifier device provided with electronic elements for rectifying the current generated in the winding of the stator,
at least one fan,
means for cooling by forced flow of a coolant fluid though the passages of the housing with the aid of the fan, and
means for cooling and evacuating to the outside the heat produced in the machine, wherein said means for cooling and evacuating comprises: the coolant fluid, and at least one heat pipe comprising:
a closed enclosure, in which circulates the coolant fluid capable of absorbing heat from the environment, through a first change of state, and releasing heat back to the environment, through another change of state,
at least one evaporation zone for absorption of the heat through evaporation of the coolant fluid, and
at least one condenser zone for restoring the absorbed heat through condensation of the coolant fluid,
wherein the heat pipe belongs to the rectifier device and stretches the at least one condenser zone into said flow of the coolant fluid, wherein the fan has two series of blades, and wherein at least one blade of at least one of the series of blades consists of a heat pipe.

18. The machine according to claim 17, wherein:
the at least one heat pipe is axially inserted in the rotor of the machine and stretches through at least one end to the outside of the rotor, said end constituting the at least one condenser zone of the heat pipe, and
said end is provided with a fan blade.

* * * * *